(12) United States Patent
Camenisch et al.

(10) Patent No.: US 9,906,512 B2
(45) Date of Patent: Feb. 27, 2018

(54) FLEXIBLE REVOCATION OF CREDENTIALS

(71) Applicant: International Business Machines Corporation, Armonk, NY (US)

(72) Inventors: Jan L. Camenisch, Thalwil (CH); Maria Dubovitskaya, Zurich (CH); Alfredo Rial Duran, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 14/810,896

(22) Filed: Jul. 28, 2015

(65) Prior Publication Data

US 2017/0034142 A1    Feb. 2, 2017

(51) Int. Cl.
*H04L 29/06* (2006.01)
*H04L 9/32* (2006.01)

(52) U.S. Cl.
CPC ............ *H04L 63/08* (2013.01); *H04L 9/3268* (2013.01)

(58) Field of Classification Search
CPC ....... H04L 63/08; H04L 9/3103; H04L 9/306; H04L 9/3033; H04L 9/3263; H04L 9/3268
See application file for complete search history.

(56) References Cited

U.S. PATENT DOCUMENTS

| | | | |
|---|---|---|---|
| 7,529,928 B2 | 5/2009 | Micali | |
| 7,543,139 B2 | 6/2009 | Camenisch et al. | |
| 2003/0177352 A1* | 9/2003 | Camenisch | H04L 9/3255 713/158 |
| 2005/0053045 A1* | 3/2005 | Chmora | H04L 63/0823 370/338 |

(Continued)

OTHER PUBLICATIONS

Abe et al., "Optimal Structure-Preserving Signatures in Asymmetric Bilinear Groups," CRYPTO 2011, 2011, pp. 649-666.

(Continued)

*Primary Examiner* — Hosuk Song
*Assistant Examiner* — J. Brant Murphy
(74) *Attorney, Agent, or Firm* — Kristofer L. Haggerty

(57) ABSTRACT

The invention relates to a computer-implemented method for handling revocation statuses of credentials, the method including: an issuing computer transmitting a public key to user and verifying computers, a revocation computer sending revocation parameters to user and verifying computer devices, issuing credentials to a user computer by an issuing computer, verifying issued credentials by the user computer, transmitting updated revocation information to the revocation computer by the verifying computer, updating provisional revocation status information by the revocation computer, updating revocation status information by the revocation computer, transmitting updated revocation information to a revocation computer by a verifying computer, updating provisional revocation status information by the (Continued)

revocation computer, transmitting updated revocation status information to the user and verifying computers by the revocation computer, creating a presentation token by the user computer, transmitting the presentation token to a verifying computer, and verifying the presentation token by the verifying computer.

21 Claims, 6 Drawing Sheets

(56) References Cited

U.S. PATENT DOCUMENTS

| | | | |
|---|---|---|---|
| 2005/0055548 A1* | 3/2005 | Micali | G06Q 20/02 713/158 |
| 2006/0156391 A1* | 7/2006 | Salowey | H04L 63/0823 726/5 |
| 2007/0016779 A1* | 1/2007 | Lyle | H04L 9/12 713/169 |
| 2010/0083347 A1* | 4/2010 | Hinton | H04L 9/3268 726/1 |
| 2012/0144459 A1* | 6/2012 | Nguyen | H04L 9/0891 726/5 |
| 2014/0281525 A1* | 9/2014 | Acar | H04L 9/3213 713/168 |
| 2014/0289512 A1 | 9/2014 | Tseng et al. | |
| 2016/0112206 A1* | 4/2016 | Cizas | H04L 9/3263 713/158 |
| 2016/0248586 A1* | 8/2016 | Hughes | H04L 9/0852 |

OTHER PUBLICATIONS

Adams et al., Internet X.509 Public Key Infrastructure Certificate Management Protocols, Network Working Group, Mar. 1999, https://www.ieff.org/rfc/rfc2510.txt, pp. 1-52.
Benaloh et al., "One-Way Accumulators: A Decentralized Alternative to Digital Signatures (Extended Abstract)," T. Helleseth (Ed.): Advances in Cryptology—EUROCRYPT '93, LNCS 765, 1994, pp. 274-285.
Bichsel et al., "Mixing Identities with Ease," L. Fritsch (Eds.): IDMAN 2010, IFIP AICT 343, 2010, pp. 1-17.
Boneh et al., "Group Signatures with Verifier-Local Revocation," 11th ACM conference on Computer and Communications Security (CCS), 2004, pp. 1-19.
Brands, "Rethinking Public Key Infrastructures and Digital Certificates: Building in Privacy," MIT Press Cambridge, MA, USA, 2000, ISBN:0262024918, pp. 1-2 (abstract only).
Brands, "Rapid Demonstration of Linear Relations Connected by Boolean Operators," W. Fumy (Ed.): Advances in Cryptology—EUROCRYPT ' 97, LNCS 1233, 1997, pp. 318-333.
Brickell et al., "The DAA scheme in context," http://digital-library.theiet.org/content/books/10.1049/pbpc006e_ch5, Jan. 2005, 1 page (abstract only).
Camenisch et al., "H2.1—ABC4Trust Architecture for Developers," ABC4Trust, Attribute-Based Credentials for Trust, Nov. 22, 2012, pp. 1-94.
Camenisch et al., "A Framework for Practical Universally Composable Zero-Knowledge Protocols," D.H. Lee and X. Wang (Eds.): ASIACRYPT 2011, LNCS 7073, 2011, pp. 449-467.
Camenisch et al., "An Accumulator Based on Bilinear Maps and Efficient Revocation for Anonymous Credentials,"—Proceedings of the 12th International Conference on Practice and Theory in Public Key Cryptography: PKC '09, 2009, pp. 481-500.
Camenisch, "Group Signature Schemes and Payment Systems Based on the Discrete Logarithm Problem," A dissertation submitted to the Swiss Federal Institute of Technology Zürich for the degree of Doctor of Technical Sciences, 1998, 191 pages.
Camenisch et al., "Dynamic Accumulators and Application to Efficient Revocation of Anonymous Credentials," M. Yung (Ed.): CRYPTO 2002, LNCS 2442, 2002, pp. 61-76.
Camenisch et al., "Practical Verifiable Encryption and Decryption of Discrete Logarithms," The Proceedings of Crypto 2003, Aug. 2003, pp. 1-41.
Camenisch et al., "Proving in Zero-Knowledge that a Number Is the Product of Two Safe Primes," J. Stem (Ed.): EUROCRYPT '99, LNCS 1592, 1999, pp. 107-122.
Camenisch et al., "A Signature Scheme with Efficient Protocols," S. Cimato et al. (Eds.): SCN 2002, LNCS 2576, 2003, pp. 268-289.
Camenisch, "Solving Revocation with Efficient Update of Anonymous Credentials," Security and Cryptography for Networks, Lecture Notes in Computer Science, vol. 6280, 2010, 18 pages.
Catalano et al., "Vector Commitments and Their Applications," K. Kurosawa and G. Hanaoka (Eds.): PKC 2013, LNCS 7778, 2013, pp. 55-72.
Chaum, "Security Without Identification: Transaction Systems to Make Big Brother Obsolete," Communications of the ACM, vol. 28, No. 10, Oct. 1985, pp. 1030-1044.
Chaum et al., "Wallet Databases with Observers," E.F. Brickell (Ed.): Advances in Cryptology—CRYPTO '92, LNCS 740, 1993., pp. 89-105.
Cheng et al., "A New Revocation Method for Standard Model Group Signature," Journal of Computers, vol. 9, No. 5, May 2014, pp. 1053-1057.
Cramer et al., "Proofs of Partial Knowledge and Simplified Design of Witness Hiding Protocols," Y.G. Desmedt (Ed.): Advances in Cryptology—CRYPTO '94, LNCS 839, 1994, pp. 174-187.
Goldwasser et al., "A Digital Signature Scheme Secure Against Adaptive Chosen-Message Attacks," Siam J. Comput., vol. 17, No. 2, Apr. 1988, 1988 Society for Industrial and Applied Mathematics, pp. 281-308.
Housley et al., "Internet X.509 Public Key Infrastructure: Certificate and Certificate Revocation List (CRL) Profile," Network Working Group, https://www.ietf.org/rfc/rfc3280.txt, printed on Oct. 15, 2015, pp. 1-93.
Izabachene et al., "Block-Wise P-Signatures and Non-interactive Anonymous Credentials with Efficient Attributes," L. Chen (Ed.): Cryptography and Coding 2011, LNCS 7089, 2011, pp. 431-450.
Kate et al., "Constant-Size Commitments to Polynomials and Their Applications*," M. Abe (Ed.): ASIACRYPT 2010, LNCS 6477, 2010, pp. 177-194.
Kohlweiss et al., "Optimally private access control," WPES '13 Proceedings of the 12th ACM workshop on privacy in the electronic society, 2013, doi>10.1145/2517840.2517857, pp. 37-48.
Lapon et al., "Analysis of Revocation Strategies for Anonymous Idemix Credentials," B. de Decker et al. (Eds.): CMS 2011, LNCS 7025, 2011, pp. 3-17.
Libert et al., "Concise Mercurial Vector Commitments and Independent Zero-Knowledge Sets with Short Proofs," D. Micciancio (Ed.): TCC 2010, LNCS 5978, 2010, pp. 499-517.
Libert et al., "Group Signatures with Almost-for-free Revocation," Advances in Cryptology—CRYPTO 2012, Lecture Notes in Computer Science, vol. 7417, 2012, pp. 1-33.
Myers et al., "X.509 Internet Public Key Infrastructure Online Certificate Status Protocol—OCSP," Network Working Group, https://tools.ietf.org/html/rfc2560, Jun. 1999, pp. 1-23.
Micali et al., "Zero-Knowledge Sets," Proceedings of the 44th Annual IEEE Symposium on Foundations of Computer Science (FOCS'03), 2003, 12 pages.
Nakanishi et al., "Revocable Group Signature Schemes with Constant Costs for Signing and Verifying," S. Jarecki and G. Tsudik (Eds.): PKC 2009, LNCS 5443, 2009, pp. 463-480.
Nguyen, "Accumulators from Bilinear Pairings and Applications," A.J. Menezes (Ed.): CT-RSA 2005, LNCS 3376, 2005, pp. 275-292.
Schnorr, "Efficient Signature Generation by Smart Cards," J. Cryptology (1991), vol. 4, 1991, pp. 161-174.
Sun et al., "A Privacy-Preserving Scheme for Online Social Networks with Efficient Revocation," Proceedings of the 29th conference on Information communications, 2010, pp. 2516-2524.

* cited by examiner

| Assignment of vector elements x[i]: | Assigment of bit positions $b_j$: |
|---|---|
| x[1] ↔ $s_1$ | $b_1$ ↔ function 1 |
| x[2] ↔ $s_2$ | $b_2$ ↔ function 2 |
| ⋮ | $b_3$ ↔ function 3 |
| x[n] ↔ $s_n$ | ⋮ |
| | $b_m$ ↔ function m |

Fig. 5

FLEXIBLE REVOCATION OF CREDENTIALS

TECHNICAL FIELD

The present invention relates generally to access credentials and more specifically to handling revocation statuses of a plurality of credentials.

BACKGROUND

Credentials, and more precisely cryptographic credentials, are commonly known and used in cryptography-based applications, e.g. cryptographically secured exchange of data between computer systems or devices, to certify information. A credential holder, who is requested to provide information, may provide the requested information and use a credential to prove that the provided information is correct and trustable. A cryptographic credential is essentially a certificate generated via a cryptographic process. Such a credential is issued by a credential issuing entity to a credential holder after the information to be certified by the credential has been appropriately verified. The information in question is cryptographically encoded in the credential to certify the correctness of said information. In particular, the information to be certified may be represented by some value or function which is then encoded in the credential via a cryptographic algorithm. When requested by a verifying entity to provide certain information and to prove the same, the credential holder may provide the requested information and use a credential, in which this information is encoded, to make a suitable proof to the verifying entity, via various cryptographic proof protocols.

Sometimes such credentials need to be revoked, e.g. when the secret cryptographic keys to which the credential is bound have been exposed or the credential holder lost the right to possess the credential.

Revocation tasks are carried out by revocation authorities. The revocation authority creates and maintains a revocation list with revocation statuses of credentials. This list may be a whitelists or a blacklist, listing all the credentials which are valid or invalid, respectively. A credential becomes invalid by revoking the same. The revocation is performed through a revocation handle, i.e. a dedicated unique identifier that the issuing entity embeds in each issued credential. When a credential is to be revoked, a request for revocation must be provided to the revocation authority. Upon receiving a valid request for revocation of a credential, the revocation authority deletes or adds the respective credential from or to the revocation list, depending on whether it is a whitelists or a blacklist.

In order to prove that a credential used for certifying information is valid, i.e. not revoked, membership or non-membership of the credential's revocation handle in the revocation authority's whitelists or blacklist has to be proven.

SUMMARY

It is an objective of the present invention to provide for an improved computer-implemented method, a computer program product and a computer system for handling revocation statuses of credentials as specified in the independent claims. Embodiments of the invention are given in the dependent claims. Embodiments of the present invention can be freely combined with each other if they are not mutually exclusive.

In one aspect, the invention relates to a method for handling revocation statuses of credentials, the method including the issuing and storing a plurality of credentials by a credential issuing computer system where each credential is provided to a user computer device that is configured for requesting one or more hardware and/or software functions offered and provided by one or more credential verifying computer systems. The method additionally includes a revocation computer system initializing and storing a revocation status vector comprising vector elements, wherein for a set of the vector elements each vector element is assigned to a different one of the credentials, each vector element comprises a sequence of bits, and each bit of the set of bits is assigned to a different one of the functions. The bit value at a given bit position of the sequence is indicative of the credential assigned to the element comprising said sequence of bits as well as a revocation status indicating whether said credential is valid or invalid for the function assigned to said bit position. For each sequence of bits the same bit positions are assigned to the same functions, transforming the revocation status vector by the revocation system into a commitment value and providing the commitment value to the one or more verifying computer systems. The method additionally includes computing a witness value by the revocation system for each vector element of the set of vector elements and providing both the vector element which is assigned to the credential of said user computer device and the respective witness value to the user computer device. The witness value proves that the vector element provided is identical to the vector element for which the witness value was computed. The method further includes generating a presentation token by the user computer device for its credential comprising the vector element provided by the revocation system and a proof of possession of the respective credential assigned to said vector element and of possession of the witness value computed for said vector element. The method additionally includes transmitting the presentation token and a request for one of the hardware and/or software functions to the respective verifying computer system by the user computer device, then receiving the presentation token and request by said verifying computer system. The verifying computer system then evaluates the requested function and the validity of the revocation status of the credential for which the presentation token was generated using the commitment value for verifying the proof of possession of the witness value comprised by the presentation token. Then, if valid, providing the requested function to the requesting user computer device.

In another aspect, the invention relates to a computer-implemented method for handling revocation statuses of credentials which includes initializing and storing a revocation status vector for a plurality of credentials to be assigned to respective user computer devices. Each credential regulates the permissions of the respective user computer device to request one or more hardware and/or software functions. The revocation status vector comprises vector elements and for a set of the vector elements, each vector element is assigned to a different one of the credentials, each vector element comprises a sequence of bits, and each set of the vector bits is assigned to a different one of the plurality of hardware and/or software functions. The bit value at a given bit position of the sequence is indicative of for the credential assigned to the element comprising said sequence of bits and a revocation status indicating whether said credential is valid or invalid for the function assigned to said bit position. For each sequence of bits, the same bit positions are assigned to the same functions. The method further includes transforming the revocation status vector into a commitment value, computing a witness value for each vector element of the set of vector elements, and providing to a respective computer user device the vector element which is assigned to the credential of said user computer device and the respective witness value. The witness value proves that the vector element provided is identical to the vector element for which the witness value was computed.

In a further aspect, the invention relates to a computer program product for handling revocation statuses of credentials, the computer program product comprising a computer readable storage medium having program instructions embodied therewith, the program instructions being executable by a processor to cause the processor to execute the method according to any one of the previous claims.

In a further aspect, the invention relates to a computer system for handling revocation statuses of credentials. The computer system comprises a processor, a storage medium, and an interface for providing and receiving data. The processor comprises program instructions executable by the processor and causing the system to initialize and store in the storage medium a revocation status vector for a plurality of credentials to be assigned to respective user computer devices. Each credential regulates the permission of the respective user computer device to request one or more hardware and/or software functions. The revocation status vector comprises vector elements and each vector element is assigned to a different one of the credentials. Each vector element comprises a sequence of bits and for a set of the bits each bit of the set of bits is assigned to a different one of the plurality of hardware and/or software functions. The bit value at a given bit position of the sequence is indicative of the credential assigned to the element comprising said sequence of bits. The revocation status indicates whether said credential is valid or invalid for the function assigned to said bit position and for each sequence of bits the same bit positions are assigned to the same functions. The program instructions further cause the system to transform the revocation status vector into a commitment value, to compute a witness value for each vector element of the set of vector elements, and to provide to a respective computer user computer device the vector element which is assigned to the credential of said user computer device and the respective witness value. The witness value proves that the vector element provided is identical to the vector element for which the witness value was computed.

BRIEF DESCRIPTION OF THE SEVERAL VIEWS OF THE DRAWINGS

Embodiments of the present invention are explained in greater detail, by way of example only, making reference to the drawings in which:

FIG. 5 depicts a tabular diagram of assignments of the revocation status vector depicted in FIG. 4.

DETAILED DESCRIPTION

Figure 1:
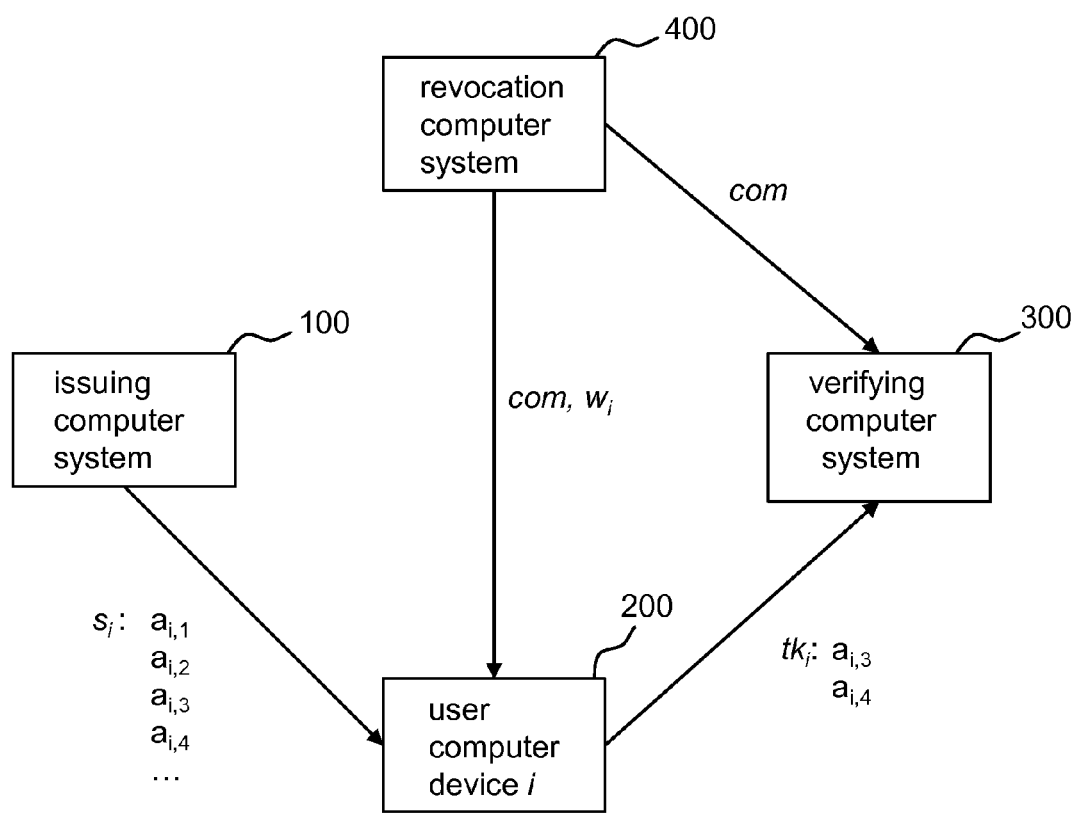
FIG. 1 depicts a schematic block diagram of a system according to embodiments of the invention.

Embodiments may be beneficial in that a credential may be assigned to be invalid only for specific functions, e.g. a user is not allowed to use a credential with a specific function of a specific verifying computer system, but may still use it elsewhere. The effect of such invalidity may be restricted to specific functions offered by specific verifying computer systems only, while it does not affect the validity of the credential for use with other verifying computer systems or for other functions.

In order to implement function specific revocation statuses for a plurality of credentials, for each credential a plurality of revocation statuses, each assigned to such a specific function, has to be handled efficiently. Considering n credentials and m hardware and/or software functions, each credential is assigned with a revocation status for each of m functions. Each credential may be assigned to a user who uses the credential via a suitable user computer device or directly to a respective user computer device. The revocation statuses indicate whether the respective credential is valid or invalid for the respective function for which the revocation status is assigned. Said revocation statuses may be summarized in m revocation lists, each list listing the revocation statuses of all n credentials for one of the m functions. The amount of data may be reduced by only listing revocation statuses for valid or invalid credentials, i.e. using whitelists or blacklists.

The method according embodiments of the present invention may allow combining information corresponding to m such revocation lists into a single commitment value. Each user or user computer device needs only one witness value to prove that a credential assigned to and possessed by said user computer device is e.g. whitelisted. A user computer device requesting a function may in general try to prove that the credential assigned to said device is valid for the requested function, i.e. is whitelisted in case of a whitelist or not blacklisted in case of a blacklist. However, a revocation status vector according to embodiments of the present invention, comprises all revocation statuses, i.e. valid as well as invalid, and thus corresponds to mixed lists which are black and white.

This may have the further advantage that the corresponding scheme is particularly efficient in terms of storage. Considering n credentials and m revocation lists for m verifying computer systems and/or functions, each list comprising the revocation statuses of each credential for the respective verifying computer system and/or function to which the list is assigned, a scheme combining each list into a commitment would require the computation of m commitment values and each user computer device would need to store and update m witness values. With a scheme according to the present invention, only one commitment value based on a respective revocation vector comprising the revocation statuses of all credentials for all computer systems and/or functions and one witness value per credential is required. Consequently, for a scheme combining each of the m lists into a commitment value of its own, the required storage capacity grows with m, while this may not be the case for embodiments of the invention.

The same may hold in terms of computation cost: To combine n credentials with respect to m revocation lists, in case of a scheme combining each list into a commitment value of its own, the number of computational operations growths with n and with m, depending on the details of the scheme e.g. n·m multiplications may be required. Computing witness values for one credential involves a similar cost.

In the present schemes, the cost of transforming n credentials with respect to m verifying computer systems and/or functions into one commitment value may involve n computational operations, one per vector element. The computation of the user witness value has a similar cost. Thus, the cost may only grow with n, not with m, e.g. the costs of computing the commitment value and witness values may only be n multiplications each. This cost may be further reduced using precomputation, because, in the present case, it is likely that, when a credential is issued for each vector element all bit values may be set to indicating validity for all verifying computer systems and/or functions.

Embodiments may have the further advantage that they allow adding or/and removing revocation statuses indicating whether a credential is valid or invalid for a function with little effort. The set of vector elements assigned to credentials may be smaller or equal to the total number of vector elements of the revocation vector. Initiating a revocation status vector with a sufficient large number of vector elements, i.e. the total number of vector elements of the revocation vector being larger than the number of vector elements of the set, new revocation statuses for a new credential may be easily added by assigning a vector element, which is not yet part of the set of vector elements, to the new credential. Thus, the set of vector elements assigned to credentials may be easily extended. When extending the set of assigned vector elements, an additional witness value for each newly assigned vector element may be computed. Furthermore, the commitment value as well as the witness values already computed may have to be updated.

Embodiments may also have the advantage that it is particularly simple to add revocation statuses for new functions. The number of bits of each set of bits assigned to functions may be smaller or equal to the total number of bits of the sequence of bits the respective set is part of. Initiating a revocation status vector, wherein each sequence of bits is sufficiently large, i.e. the total number of bits of each sequence of bits being larger than the number of bits of the set of assigned bits comprised by the respective sequence, a new function may be easily added by assigning a bit of each sequence of bits, which has not yet been assigned to a function, to the new function. Thus, each set of bits assigned to functions may be easily extended. When extending the sets of bits assigned to functions, no additional commitment or witness values may have to be computed. It may be sufficient to update the commitment value as well as the witness values already computed. In case the revocation statuses for a certain function should not be taken into account anymore, e.g. because the respective function is not offered anymore, the function may be easily removed by checking for each sequence of bits, whether the bit value at the position of the sequence of bits assigned to the respective function indicates invalidity for the respective function, and, if not, altering the respective bit value such that it indicates invalidity. Again, no additional commitment or witness values may have to be computed. It may rather be sufficient to update the commitment value as well as the witness values already computed.

According to an example, the bit values of bits which are comprised by the revocation status vector, but not assigned to any function may be chosen such that they indicate invalidity. Furthermore, when computing the commitment value, according to an example only those vector elements of the revocation status vector assigned to a credential may be taken into account.

According to embodiments, the method further comprises revoking by the revocation computer system the credential in response to receiving a revocation request to revoke the credential for a function offered by the verifying computer system, the revocation comprising generating an updated vector element for the vector element of the revocation status vector assigned to the credential to be revoked by altering the revocation status associated with the credential to be revoked, providing said updated vector element to the user computer device to which the updated vector element is assigned via the credential to be revoked, updating the commitment value with said updated vector element and providing said updated commitment value to the one or more verifying computer systems and to the user computer device to which the updated vector element is assigned via the credential to be revoked, updating each witness value which computation included the vector element for which the updated vector element is generated with said updated vector element and providing each updated witness value to the user computer device to which the updated witness value is assigned via the vector element for which the updated witness value is computed.

This may have the advantage that a credential may be easily revoked for one specific function, while it remains valid for other functions.

A credential may be revoked for different reasons: Issuer-driven revocation is global in scope, meaning that any presentation token is checked against the most recent revocation information provided by the specified revocation authority and that the issuing entity denies any responsibility for revoked credentials.

Issuer-driven revocation may be used when credentials have been compromised or lost, or when the user is denied all further use of the credential. Issuer-driven revocation for a credential may be performed by the revocation computer system upon receiving a corresponding revocation request from the issuing computer system by altering all bit values of the vector element assigned to said credential to values indicating invalidity.

Verifier-driven revocation may aim to revoke a credential such that it cannot be used anymore for gaining access to hardware and/or software functions provided by anyone of the verifying computer systems. Such a revocation may be initiated by anyone of the verifying computer systems or a third party. A verifier-driven revocation may e.g. be based on a no-fly list, preventing persons, whose names are on said list from purchasing a flight ticket or passing security controls, when trying to gain access to a plane. A verifier-driven revocation may also be used to excluding a user from a website by denying access to the same. The effect of the revocation may be restricted to the functions offered by such verifying computer systems that explicitly specify the revocation computer system in their presentation policies, and does not affect presentations with other verifying computer systems.

Revocation may be performed through a revocation handle, a dedicated unique identifier that the issuing computer system embeds in each issued credential. When the issuing computer system, a verifying computer system, or any third party wants to revoke a credential, it may provide the respective revocation handle to the revocation computer system. The revocation handle could be revealed, for example, by enforcing in a presentation policy for presentation token that the revocation handle be encrypted with the public key of a trusted entity, which decrypts it when receiving a proof of user misbehavior.

Furthermore, this may have the advantage of allowing an efficient update of the commitment value and witness values due to a revocation of a credential for a verifying computer system and/or function. For a scheme with m independent revocation lists, updating the revocation status of a credential with respect to each of the m revocation lists may involve m computational operations, e.g. m multiplications, i.e., one computational operation for each of the commitments in which the status should be updated. Updating the witnesses involves a similar cost. In a construction according to embodiments of the invention, an update may require only one computational operation for the commitment value and one per witness value. Thus, the cost may only grow with n, not with m.

Updating a witness assigned to a user computer device imposes an important overhead on the revocation computer system, when the number of user computer devices is large. However, according to an embodiment of the invention with a non-hiding revocation scheme, the witness values may be updated by user computer devices because the update algorithm only needs public information.

According to embodiments, altering the revocation status of the credential comprises altering in the bit sequence of the vector element assigned to said credential to be revoked the bit value at the bit position assigned to said function to be revoked from a value indicating validity to a value indicating invalidity.

This may have the advantage that the revocation status of a credential for a particular function may be easily altered by altering the corresponding bit value. From the bit position it can be easily derived for which function the credential is revoked.

According to embodiments, the revocation request is a request of a set of revocation requests, the revocation comprising collecting the received revocation requests until a collection criterion is fulfilled, in case the collection criterion is fulfilled, updating the vector elements of the revocation vector, the commitment value and the witness values according to the collected revocation requests.

This may have the advantage that by bundling the revocation requests computational resources are saved. The whole update procedure is not executed for every single revocation request independently, but only after a collection criterion has been fulfilled. Before executing the update procedure, i.e. as long as the criterion is not fulfilled, revocation requests are collected. A collection criterion may for example be a laps of time, in particular laps of a predetermined time, an absolute time, a number of requests, a processor load available as well as combinations thereof.

According to embodiments, the method further comprises initializing by the revocation computer system a provisional revocation status vector identical to the initialized revocation status vector, the collecting of the received revocation requests comprising altering the revocation statuses identified by the provisional revocation status vector according to the received revocation requests, the updating of the vector elements of the revocation vector, the commitment value and the witness values being performed with the vector elements of the provisional vector elements differing from the corresponding vector elements of the revocation vector.

This may have the advantage that it can be efficiently kept track on the revocation requests collected over a predetermined time before executing the update procedure.

According to embodiments, the transformation for transforming the revocation status vector being described by x into the commitment value being described by com is:

$$com = \prod_{j=1}^{n} g_{\ell+1-j}^{x[j]}$$

the witness value being described by $w_i$ for the ith vector element being described by x[i] being computed by:

$$w_i = \prod_{j=1, j \neq i}^{n} g_{\ell+1-j+i}^{x[j]}$$

said commitment value com and witness values $w_i$ being updated with the updated vector element denoted by x'[j] by $$com' = com \cdot \frac{g_{\ell+1-j}^{x'[j]}}{g_{\ell+1-j}^{x[j]}}$$

and $$w_i' = w_i \cdot \frac{g_{\ell+1-j+i}^{x'[j]}}{g_{\ell+1-j+i}^{x[j]}}$$

i∈[1,n], j∈[1,n], x[j] with j∈[1,n] and |x|=n≤ $\ell$ denoting the jth vector element of the n vector elements of the revocation status vector x, each vector element being a sequence of m bits, a bit value of 1 indicating validity and a value of 0 indicating invalidity of the credential for the function the bit is assigned to, the bit sequence further being handled as a binary number for the above transformations and computations, $g_i = g^{(\alpha^i)}$ and $\tilde{g}_i = \tilde{g}^{(\alpha^i)}$ with $\alpha \leftarrow \mathbb{Z}_p$, $g \in \mathbb{G}$ and $\tilde{g} \in \tilde{\mathbb{G}}$, $\mathbb{Z}_p$ being the additive group modulo p, $\mathbb{G}$ and $\tilde{\mathbb{G}}$ being groups of prime order p, com' denoting the updated commitment value and $w_i'$ denoting the updated witness value for the ith vector element x[i].

This may have the advantage of allowing an efficient update of the commitment value and witness values, when the credential is revoked for a function. For a scheme with m independent revocation lists, updating the revocation status of a credential with respect to each of the m revocation lists may involve m computational operations, e.g. m multiplications, i.e., one computational operation for each of the commitments in which the status should be updated. Updating witnesses involves a similar cost. According to embodiments of the invention, an update may only require one computational operation for the commitment value and one per witness value. Thus, the cost may only grow with n, not with m.

According to embodiments, the transformation for transforming the revocation status vector being described by x into the commitment value being described by com incorporating a random number $r \leftarrow \mathcal{R}$:

$$com = g^r \cdot \prod_{j=1}^{n} g_{\ell+1-j}^{x[j]}$$

the witness value being described by $w_i$ for the ith vector element being described by x[i] incorporating the same random number $r \leftarrow \mathcal{R}$:

$$w_i = g^r \cdot \prod_{j=1, j \neq i}^{n} g_{\ell+1-j+i}^{x[j]}$$

said commitment value com and witness values $w_i$ being updated with the updated vector element denoted by x'[j] and a random number $r' \leftarrow \mathcal{R}$ assigned to said updated vector element $$com' = com \cdot \frac{g^{r'} \cdot g_{\ell+1-j}^{x'[j]}}{g^{r} \cdot g_{\ell+1-j}^{x[j]}}$$

and $$w'_i = w_i \cdot \frac{g^{r'} \cdot g_{\ell+1-j+i}^{x'[j]}}{g^{r} \cdot g_{\ell+1-j+i}^{x[j]}}$$

i∈[1,n], j∈[1,n], x[j] with j∈[1, n] and |x|=n≤ℓ denoting the jth vector element of the n vector elements of the revocation status vector x, each vector element being a sequence of m bits, a bit value of 1 indicating validity and a value of 0 indicating invalidity of the credential for the function the bit is assigned to, the bit sequence further being handled as a binary number for the above transformations and computations, $g_i = g^{(\alpha^i)}$ and $\tilde{g}_i = \tilde{g}^{(\alpha^i)}$ with $\alpha \leftarrow \mathbb{Z}_p$, $g \in \mathbb{G}$ and $\tilde{g} \in \tilde{\mathbb{G}}$, $\mathbb{Z}_p$ being the additive group modulo p, $\mathbb{G}$ and $\tilde{\mathbb{G}}$ being groups of prime order p, com' denoting the updated commitment value and $w_i$ denoting the updated witness value for the ith vector element x[i].

This may have the advantage of allowing constructing a so-called hiding commitment value, such that based on a commitment value and an updated commitment value it is impossible to learn which credentials have been added to or revoked from the revocation vector. This is due to the additional random numbers r, r' incorporated into the commitment value, which are only known to the revocation computer system.

According to embodiments, the generation of the presentation token further comprises computing an additional commitment to the vector element comprised by the presentation token and an additional witness proving that the additional commitment is a commitment to said vector element, the presentation token comprising a proof of possession of the additional witness proving that the provided vector element is identical to the vector element assigned to the credential for which the presentation token was generated and proving that the bit value at the bit position of the sequence of bits of said vector element assigned to the requested function identifies a revocation status indicating that said credential is valid for the function assigned to said bit position.

This may have the advantage that by using the presentation token, the user computer device is enabled to prove to the verifying computer system that the credential possessed by the user computer device is valid for the requested function, while hiding further bit values assigned to said credential.

According to embodiments, the credential provided to the user computer device is an attribute-based credential comprising attributes incorporated into the credentials by the issuing computer system, the attributes being assigned to the user of the user computer device to which the credential is provided, the presentation token generated by the user computer device further revealing at least one of the attributes of the credential, the generation of the presentation token determining which one of the attributes is revealed in the generated presentation token.

This may have the advantage that the user is enabled to select which attributes are revealed, thus enhancing the user's privacy and even allowing the user to remain anonym.

The attributes may be encoded in the credential to be certified by using the credential. Such an attribute may represent any information associated with a credential holder, i.e. a user or user computer device, for which the credential holder may be required to provide proofs of correctness and trustworthiness. A method according to embodiments of the invention may be particularly suitable for privacy-enhancing attribute-based credentials (PABC), also known as anonymous credentials or minimal-disclosure tokens, which are credentials allowing for data-minimizing authentication. Cryptographic mechanisms based on PABCs enable a user or user computer device to obtain a credential from an issuing entity or issuing computer system, by which the issuing computer system assigns a list of certified attribute values to the user or user computer device. Particular examples of attribute-based credentials include government or electronic ID cards certifying personal or other security-sensitive information, like a user's name, nationality, municipality, date of birth, about which proofs may need to be made by a credential holder, i.e. user of a credential, in order to gain access to a software and/or hardware function provided by a verifying computer system. The user computer device may use this credential to authenticate to a verifying computer system offering hardware and/or software functions for which certain authentication is required by computing a presentation token. Such functions comprise e.g. access to a service, facility or other resource.

Moreover, different presentation tokens generated using PABCs may have the advantage to be untraceable, in the sense that a verifier cannot tell whether they were computed by the same or by different users. PABCs offer important privacy advantages over other attribute credential schemes, which usually either employ a central authority that is involved in every authentication and therefore forms a privacy bottleneck (e.g., SAML, OpenID, or Facebook Connect), or force users to disclose all of their attributes (e.g., X.509 certificates).

This may have the further advantage that a revocation may be performed based on any attribute, not just based on the revocation handle. It is up to the verifying computer systems and/or the revocation computer system to choose an attribute that on the one hand is sufficiently identifying to avoid false positives and on the other hand will be known to the party likely to request the revocation of a credential.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may execute on a computer system configured for ensuring privacy. Therefore, the computer readable program instructions may execute on a trusted computer using secure communication channels. In case of outsourcing of computations secure schemes for ensuring privacy may be applied.

According to the present invention a method for handling revocation statuses of credentials and in particular a method for revoking such credentials is proposed which refers to a revocation status vector. The revocation status vector is transformed into to a single commitment value.

As examples, two embodiments of the method may be proposed, one based on a non-hiding commitment and the other one on a hiding commitment. These embodiments may for example be implemented based on the Diffie-Hellman Exponent (DHE) assumption.

In the first non-hiding embodiment, when computing a presentation token, the user computer device may reveal $x[i]$ to the verifying computer system. The verifying computer system therefore learns the revocation status of the user computer device in all m revocation lists, i.e. all values $x[i,j]$ for credential i and $j \in [0; m]$.

In the second hiding embodiment, a construction that employs hiding all the revocation statutes of a credential i except for one may be implemented. The presentation tokens only reveal the bit $x[i, j]$ to the verifying computer system. This second construction hides the revocation status of a credential from the user computer devices of other credentials of the same type as well as from the verifying computer systems.

FIG. 1 is a schematic diagram of an exemplary system executing a method according to embodiments of the invention. The system comprises a credential issuing computer system 100 for issuing a credential provided to the user computer device 200. The system furthermore comprises a verifying computer system 300 which may for example be configured as a video streaming service system offering video streaming on demand. In order to provide a function requested by the user computer device 200, the verifying computer system 300 may require certain information from the user computer device 200. For example for some or all videos provided by the video streaming service system, said system may require information about the date of birth and municipality of a user requesting via a user computer device contents provided by the video streaming service system. The video streaming service system may e.g. require that the user lives in a municipality of a certain country and is of legal age, e.g. 18 years or older, in order to be granted access to the contents. For that purpose the user computer device 200 may be provided with a PABC credential $s_i$ containing a plurality of attributes $a_{i,1}, a_{i,2}, a_{i,3}, a_{i,4}, \ldots$ assigned to the user of user computer device 200. As an example, these attributes may be inter alia the users name→$a_{i,1}$, nationality→$a_{i,2}$, municipality→$a_{i,3}$ and date of birth→$a_{i,4}$. This credential $s_i$ may be an electronic document like an electronic ID card, driver's license or passport issued by a government agency via the issuing computer system 100.

However, the user may not want to disclose all attributes contained in credential $s_i$. Furthermore, not all the assigned attributes may be necessary for a sufficient authentication. In order to satisfy geographical restrictions or age-restrictions, it may only be necessary to provide attributes like municipality and date of birth. It may even be sufficient to prove that the user is of a certain minimum age, e.g. of legal age. Therefore, the user computer device may not provide the credential $s_i$ to verifying computer system 300, but a presentation token $tk_i$ generated by the user computer device 200, disclosing only a subset of the attributes, e.g. $a_{i,3}$ and $a_{i,4}$, whereas all non-disclosed attributes remain hidden from the verifying computer system 300. In case of a verifying computer system 300 configured as a video streaming service, the subset of attributes disclosed by a presentation token may be for example $a_{i,3}$→municipality and $a_{i,3}$→date of birth.

Attribute-based credentials need to be revoked for different reasons. In some cases, credentials need to be revoked globally, e.g., when the related secret keys are exposed, the user lost the right to possess a credential, or the attribute values have changed. Sometimes credentials may have to be revoked only for specific functions, i.e., a user is not allowed to use a credential with a specific verifier but can still use it elsewhere. Revocation tasks may be carried out by a revocation computer system 400 of a revocation authority. Such a revocation authority is a separate entity in general, but may be under the control of the issuing entity or a verifying entity in particular settings. Nevertheless, the revocation computer system 400 may in general be separate from the issuing computer system 100 and the verifying computer system 300.

The user computer device 200 is provided with a commitment value com of the revocation status of credential $s_i$ and a witness value $w_i$. Furthermore, the video streaming service system 300 is also provided with the commitment value com.

The concept of commitment is a fundamental concept in cryptography applications and essentially involves use of a cryptographic function to generate cryptographic information, the commitment, which encodes information to which the provider of the commitment wants to commit. Cryptographic proofs can then be made about the value in the commitment without revealing the value itself. Furthermore, the provider of the commitment may also provide a witness, the witness being cryptographic information, which can prove that certain information is identical to or part of the information encoded in the commitment.

A commitment value com is provided, in which the revocation statuses of the credentials issued by the issuing computer system 100 are encoded. Each user computer device in addition to be provided with a credential $s_i$ is also provided with a witness value $w_i$ assigned to said credential proving that a certain combination of revocation statuses, i.e. a list of revocation statuses, is indeed the correct list of revocation statuses of this credential cryptographically encoded into said commitment value com.

To provide certified information, e.g. information certified by the credential, to the verifying computer system, the user computer device may generate a presentation token $tk_i$, which instead of disclosing all information comprised by the credential, e.g. all attributes, only selective information. Such a presentation token $tk_i$ provides cryptographic evidence of the disclosed attribute values.

Instead of disclosing name, nationality, municipality and date of birth of the a user, like the credential assigned to the user, a presentation token may be generated, only revealing the two attributes municipality and date of birth to the verifying computer system 300. The presentation token may also prove that a given predicate holds, without revealing the full attributes' values. The presentation token may e.g. prove that the date of birth is before a certain given date or that the name on the user's credit card matches that on her driver's license.

Regarding the revocation status of the credential $s_i$ for the video streaming function provided by the video streaming service system 300, the presentation token $tk_i$ may further comprise the revocation status $x_i$ and the witness value $w_i$. The witness value $w_i$ proving that the revealed revocation status $x_i$ is part of the revocation information encoded within the commitment value com. The respective commitment value com may be provided to verifying computer system 300 by the revocation computer system 400. Consequently, the verifying computer system 300 knows that the provided commitment value com is trustable and is enabled to verify with the commitment value com and the witness value $w_i$ that the revealed revocation status $x_i$ is the correct revocation status committed to and thus certified by the revocation computer system 400.

A setting for executing the method according to the present invention comprises an issuing computer system $I$ 100, a revocation computer system $\mathcal{R}$ 400, n user computer devices $\mathcal{U}_1, \ldots, \mathcal{U}_n$ 200, 200' and m verifying computer systems $\mathcal{V}_1, \ldots, \mathcal{V}_m$ 300, 300', 300''. The issuing computer system $I$ 100 issues n credentials $s_1, \ldots, s_n$ to each of the user computer devices $\mathcal{U}_1, \ldots, \mathcal{U}_n$. Each credential $s_i$ signs a set of l attributes $(a_{i,1}, \ldots, a_{i,l})$ and a revocation handle $rh_i$. The revocation handle $rh_i$ is data element identifying the ith credential $s_i$, e.g. a serial number. When handling the revocation statuses of a credential $s_i$, the revocation handle $rh_i$ is used to unambiguously identify the credential $s_i$. For simplicity, a integer $rh_i=i$ may be assigned for identifying the ith credential.

Figure 2:
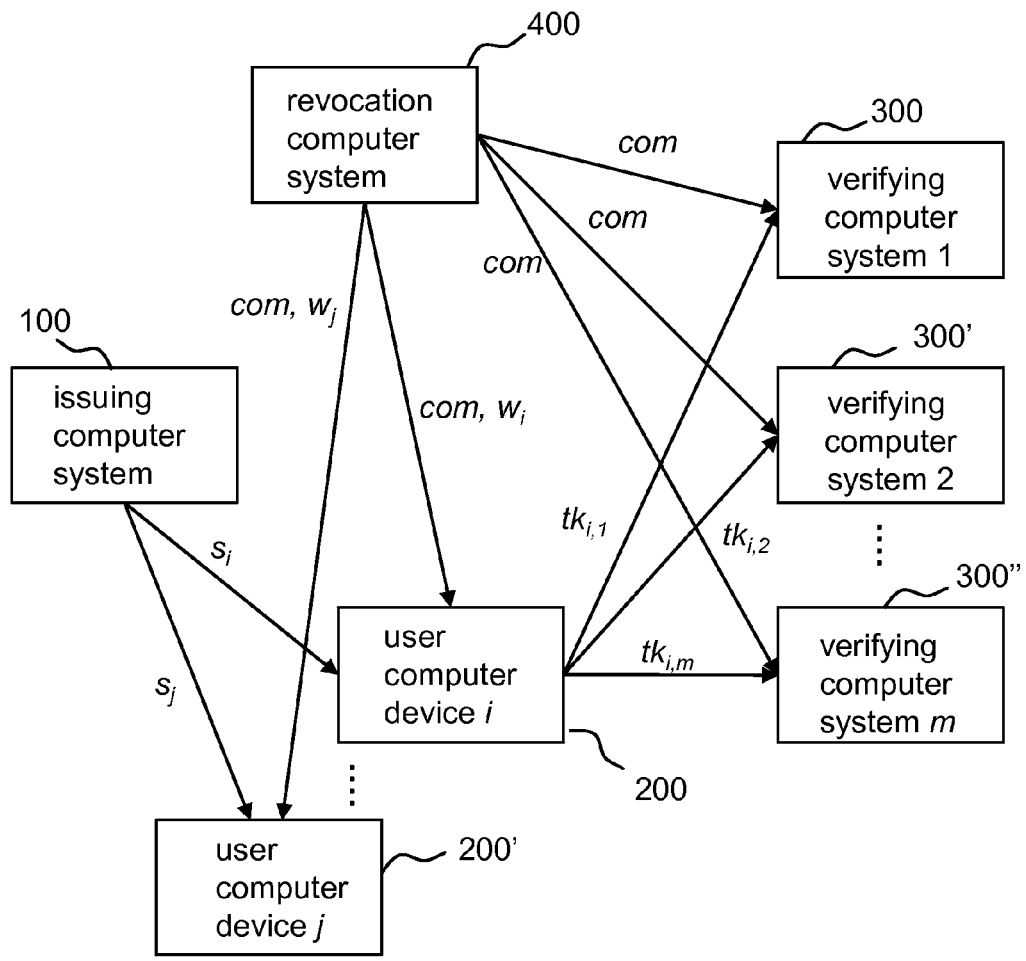
FIG. 2 depicts a schematic block diagram of a system according to embodiments of the invention.

FIG. 2 is a schematic diagram of an exemplary computer system executing the method according to embodiments of the invention, with a plurality of user computer devices 200, 200' and verifying computer systems 300, 300', 300". The revocation computer system initializes a revocation status vector comprising the revocation statuses of all credentials $s_i$, $s_j$ for all m verifying computer systems 300, 300', 300". All user computer devices 200, 200' and verifying computer systems 300, 300', 300" are provided with the commitment value com committing to said revocation statuses. Furthermore, each user computer devices 200, 200' is provided with a witness value $w_i, \ldots, w_j$ for the revocation statuses of the credentials $s_i, \ldots, s_j$ assigned to the said user computer devices $i \ldots, j$, respectively. Thus, each one of the user computer devices, e.g. user computer device i 200 may generate presentation token $tk_{i,1}, tk_{i,2}, \ldots, tk_{i,m}$ for each of the all m verifying computer systems 300, 300', 300". Each presentation token $tk_{i,1}, tk_{i,2}, \ldots, tk_{i,m}$ providing the revocation statuses of the credential $s_i$ and the witness value $w_i$, proving that the revocation statuses are identical with the revocation statuses of credential $s_i$, which have been encoded within the commitment value com, and thus authentic.

Figure 3:
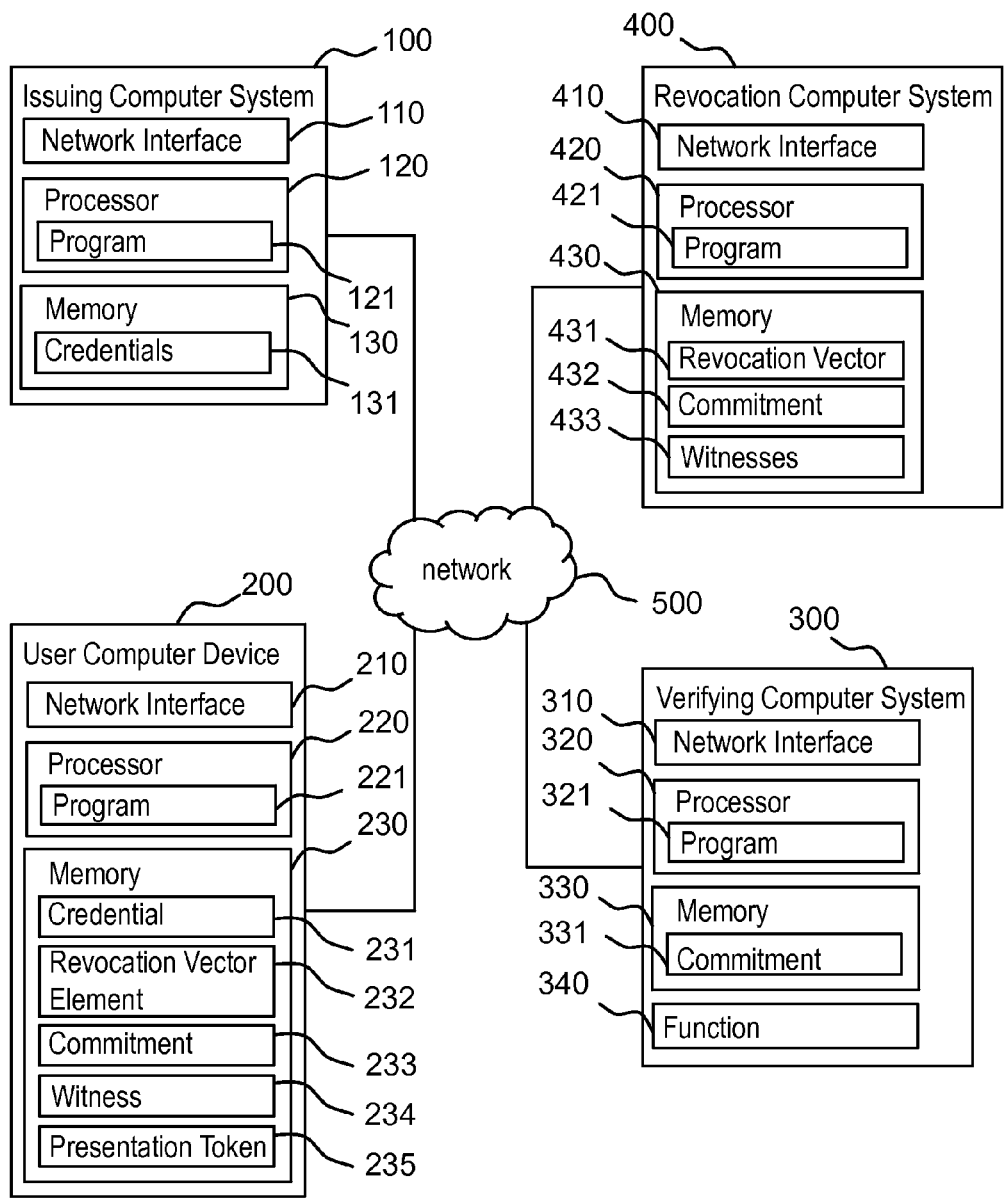
FIG. 3 depicts a schematic block diagram of a system according to embodiments of the invention.

FIG. 3 shows a schematic diagram of devices and computer systems which may be used for executing the method according to embodiments of the invention. In FIG. 3 exemplary issuing computer system 100, user computer device 200, verifying computer system 300 and revocation computer system 400 are depicted. These computer devices and system are each connected to the network 500 via which data is transmitted between these computer devices and system like a commitment value com, the witness values $w_i$, a presentation token tk etc. For connecting to the network 500, each computer device and system comprises a network interface 110, 210, 310, 410. The computer devices and systems each comprises a processor 120, 220, 320, 420 with program instructions 121, 221, 321, 421 for executing the steps of the method according to the present invention. Furthermore, the computer devices and systems each comprises a memory device 130, 230, 330, 430, i.e. a computer data storage, for storing the data generated by and transmitted between the computer devices and systems. Thus, the memory 130 of the issuing computer system 100 may comprise the credentials 131 issued by said system. The memory 430 of the revocation computer system 400 may comprise the revocation status vector 431 as well as a commitment value 432 resulting from a transformation of the vector 431 and witness values 433 computed from vector 431. In the memory 230 of the user computer device 200 a credential 231 assigned to the user computer device 200 along with the vector element 232 of revocation status vector 432 comprising all revocation statuses of credential 231 may be stored. Furthermore, the commitment value 233 received from the revocation computer system 400 together with a witness value 234 for vector element 232 may be comprised by memory 230. Also a presentation token 235, generated by the user computer device 200 may be stored in the memory 230. The verifying computer system 300 may store in its memory 330 the commitment value 331 received from the revocation computer system 400 via the network 500. The verifying computer system 300 further comprises a hardware and/or software function 340, which it offers to the user computer device 200.

It is understood that the computer devices and system shown in FIG. 3 may comprise more computer elements than the ones depicted, in particular the verifying computer system may provide more than one hardware and/or software function. Further, more data may be stored in the memories 130, 230, 330, and 430. Finally, although only one user computer device 200 and one verifying computer system 300 are shown as examples the method according to embodiments of the invention may be intended for handling a plurality of credentials assigned to a plurality of user computer devices, wherein each credential is assigned with a plurality of revocation statuses for a plurality of functions offered by a plurality of verifying computer systems.

In order to efficiently manage revocation of function-specific revocations for a plurality of n credential and m functions, according to embodiments of the invention a method is suggested, based on a vector structure from which a single commitment value is derived by transforming the vector. That method may allow combining information resembling m revocation lists into a single commitment value. More specifically, the revocation computer system may commit to a vector x of size n, where n is the number of credentials of a certain type and thus probably also the number of user computer devices that possess a credential of said type. The component x[i] is associated to user or user computer device i. The jth bit of x[i] may be denoted by x[i,j]. Furthermore, x[i,j]=1 may denote that the credential of user computer device i is valid according to revocation list j, while x[i,j]=0 may indicate that the corresponding credential is revoked for the specific function i. In this scheme each user computer device needs only one witness value $w_i$.

Figure 4:
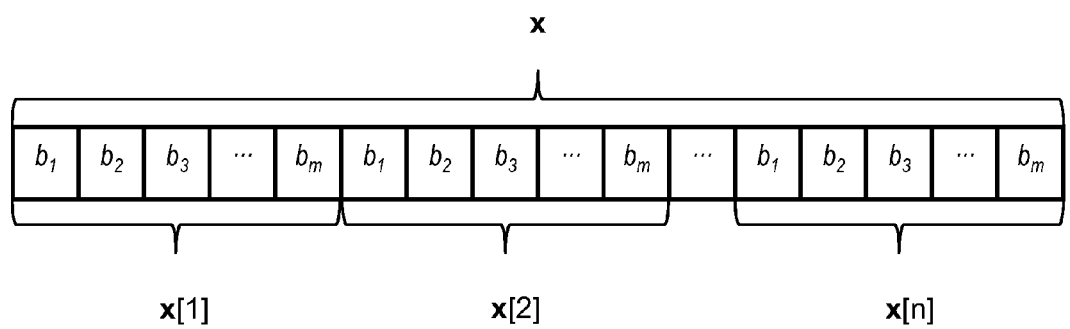
FIG. 4 depicts a schematic block diagram of a revocation status vector according to embodiments of the invention.

FIG. 4 shows a schematic diagram of a revocation status vector x according to embodiments of the invention. The revocation status vector is of size n, i.e. it comprises n vector elements x[1], . . . , x[n]. Each vector element x[i] is assigned to a different one of the credentials $s_i$, each vector x[i] element comprises a sequence of m bits x[i, 1], . . . , x[i, m]. Thus, each sequence of bits comprises m bit positions $b_1, \ldots, b_m$ form bits x[i, 1], . . . , x[i, m]. Each bit x[i, j] of a sequence of bits is assigned to a different one of a plurality of hardware and/or software functions and for each sequence of bits the same bit positions $b_j$ are assigned to the same functions.

FIG. 5 shows a tabular diagram of the assignments of vector elements x[1], . . . , x[n] of the revocation status vector x shown in FIG. 4 as well as the assignments of the bit positions $b_1, \ldots, b_m$. Vector elements x[1], . . . , x[n] are assigned to credential $s_1, \ldots, s_n$. The positions $b_1, \ldots, b_m$ of each sequence of bits are assigned to function 1, . . . , function m. The bit value x[i, j] at a given bit position $b_j$ of the sequence of bits of vector element x[i] identifies, for the credential $s_i$ assigned to the vector element x[i], a revocation status indicating whether said credential $s_i$ is valid or invalid for the function j assigned to said bit position $b_j$.

The revocation status vector x shown in FIG. 4 is transformed into a single commitment value. The transformation of the revocation status vector into a single commitment value may for example be based on bilinear maps satisfying the t-DHE assumption: For finite groups $\mathbb{G}$, $\widetilde{\mathbb{G}}$, $\mathbb{G}_t$ of prime order p a with a map e: $\mathbb{G} \times \widetilde{\mathbb{G}} \to \mathbb{G}_t$ satisfying bilinearity, $e(g^x, \tilde{g}^y) = e(g, \tilde{g})^{xy}$ holds true. The groups may further be non-degenerated, i.e. for all generators $g \in \mathbb{G}$ and $\tilde{g} \in \widetilde{\mathbb{G}}$ of the groups $\mathbb{G}$ and $\widetilde{\mathbb{G}}$, respectively, $e(g, \tilde{g})$ is a generator of $\mathbb{G}_t$. The map e: $\mathbb{G} \times \widetilde{\mathbb{G}} = \mathbb{G}_t$ may further satisfy efficiency, i.e., there exists an efficient algorithm $\mathcal{G}(1^k)$ that outputs the pairing group setup (p, $\mathbb{G}$, $\widetilde{\mathbb{G}}$, $\mathbb{G}_t$, e, g, $\tilde{g}$) and an efficient algorithms to compute e(a, b) for any $a \in \mathbb{G}$ and $b \in \widetilde{\mathbb{G}}$. If $\mathbb{G} = \widetilde{\mathbb{G}}$ the map is called symmetric and otherwise asymmetric.

The t-DHE assumption is defined as follows: Let $(p, \mathbb{G}, \widetilde{\mathbb{G}}, \mathbb{G}_t, e, g, \tilde{g}) \leftarrow \mathcal{G}(1^k)$ and $\alpha \leftarrow \mathbb{Z}_p$, given $(p, \mathbb{G}, \widetilde{\mathbb{G}}, \mathbb{G}_t, e, g, \tilde{g})$ and a tuple $(g_1, \tilde{g}_1, \ldots, g_t, \tilde{g}_t, g_{t+2}, \ldots, g_{2t})$ such that $g_i = g^{(\alpha^i)}$ and $\tilde{g}_i = \tilde{g}^{(\alpha^i)}$, for any probabilistic polynomial-time (PPT) adversary $\mathcal{A}$ $\Pr[g^{(\alpha^{t+1})} \leftarrow \mathcal{A}(p, \mathbb{G}, \widetilde{\mathbb{G}}, \mathbb{G}_t, e, g, \tilde{g}, g_1, \tilde{g}_1, \ldots, g_t, \tilde{g}_t, g_{t+2}, \ldots, g_{2t})] \leq \epsilon(k)$ is satisfied.

A commitment may be based on the following schemes: A non-interactive commitment scheme may consist of algorithms CSetup, Com and VfCom. CSetup($1^k$) generates the parameters of the commitment scheme $par_c$, which include a description of the message space $\mathcal{M}$. Com ($par_c$, x) outputs a commitment com to x and auxiliary information open. A commitment is opened by revealing (x, open) and checking whether VfCom ($par_c$, com, x, open) outputs 1 or 0. A commitment scheme is required to fulfill the correctness, hiding and binding properties.

Correctness requires that VfCom accepts all commitments created by algorithm Com, i.e., for all $x \in \mathcal{M}$ $$\Pr\left[\begin{array}{c} par_c \leftarrow CSetup(1^k); (com, open) \leftarrow Com(par_c, x): \\ wit \leftarrow Prove(par_c, com, x, open): \\ 1 = VfCom(par_c, com, x, wit) \end{array}\right] = 1.$$

The hiding property ensures that a commitment com to x does not reveal any information about x, whereas the binding property ensures that com cannot be opened to another value x'. Thus, for any PPT adversary $\mathcal{A}$, the hiding property may be defined as follows:

$$\Pr\left[\begin{array}{c} par_c \leftarrow CSetup(1^k); \\ (x_0, x_1, st) \leftarrow \mathcal{A}(par_c) \\ b \leftarrow \{0, 1\}; (com, open) \leftarrow Com(par_c, x_b); \\ b' \leftarrow \mathcal{A}(st, com): \\ x_0 \in \mathcal{M} \wedge x_1 \in \mathcal{M} \wedge b = b' \end{array}\right] \leq \frac{1}{2} + \epsilon(k).$$

The binding property is satisfied, if for any PPT adversary $\mathcal{A}$ the following holds true:

$$\Pr\left[\begin{array}{c} par_c \leftarrow CSetup(1^k); (com, x, wit, x', wit') \leftarrow \mathcal{A}(par_c): \\ x \in \mathcal{M} \wedge x' \in \mathcal{M} \wedge x \neq x' \wedge 1 = VfCom(par_c, com, x, wit) \\ \wedge 1 = VfCom(par_c, com, x', wit') \end{array}\right] \leq \epsilon(k).$$

A general cryptographic signature scheme consists of the algorithms KeyGen, Sign, and VfSig. Algorithm KeyGen ($1^k$) outputs a secret key sk and a public key pk, which include a description of the message space $\mathcal{M}$. Sign (sk, m) outputs a signature s on message $m \in \mathcal{M}$. VfSig(pk, s, m) outputs 1 if s is a valid signature on m and 0 otherwise. This definition may be extended to blocks of messages $\overline{m} = (m_1, \ldots, m_n)$. Such a signature is required to fulfill the correctness and existential unforgeability properties.

Correctness ensures that algorithm VfSig accepts the signatures created by algorithm Sign on input of a secret key computed by algorithm KeyGen. More formally, correctness may be defined as follows:

$$\Pr\left[\begin{array}{c} (sk, pk) \leftarrow KeyGen(1^k); \\ m \leftarrow \mathcal{M}; \\ s \rightarrow Sign(sk, m): \\ 1 = VfSig(pk, s, m) \end{array}\right] = 1.$$

The property of existential unforgeability ensures that it is not feasible to output a signature on a message without the secret key or another signature on that message. With $\mathcal{O}_s$ being an oracle that, on input sk and a message $m \in \mathcal{M}$, outputs Sign (sk, m), and let $S_s$ be a set that contains the messages sent to $\mathcal{O}_s$, for any PPT adversary $\mathcal{A}$ and for a positive integer L, L-existential unforgeability is defined as follows:

$$\Pr\left[\begin{array}{c} (sk, pk) \leftarrow KeyGen(1^k); \\ (m, s) \leftarrow \mathcal{A}(pk)^{\leftrightarrow \mathcal{O}_s(sk, \cdot)}: \\ 1 = VfSig(pk, s, m) \wedge m \in \mathcal{M} \wedge m \notin S_s \wedge |S_s| \leq L \end{array}\right] \leq \epsilon(k).$$

For embodiments of the invention for example a structure preserving signature (SPS) scheme may be applied. In a SPS scheme the public key, the messages, and the signatures are group elements in groups $\mathbb{G}$ and $\widetilde{\mathbb{G}}$. Further, verification is required to consist purely in the checking of pairing product equations. SPS may be employed to sign group elements, while still supporting efficient zero-knowledge proof of knowledge (ZKPK) of signature possession.

For example a scheme may be applied in which a elements in group G and b elements in group $\widetilde{\mathbb{G}}$ are signed. For this scheme the following functions may be used:

KeyGen (grp, a, b): With $grp = (p, \mathbb{G}, \widetilde{\mathbb{G}}, \mathbb{G}_t, e, g, \tilde{g})$ being the bilinear map parameters, $u_1, \ldots, u_b, v, w_1, \ldots, w_a, z \leftarrow \mathbb{Z}^*_p$ are picked at random and $U_i = g^{u_i}$, $i \in [1, b]$, $V = \tilde{g}^v$, $W_i = \tilde{g}^{w_i}$, $i \in [1, a]$ and $Z = \tilde{g}^z$ are computed. Based on these parameters the verification key $pk = (grp, U_1, \ldots, U_b, V, W_1, \ldots, W_a, Z)$ and the signing key $sk = (pk, u_1, \ldots, u_b, v, w_1, \ldots, w_a, z)$ are returned. The verification key is in general public, while the signing key is secret.

Sign (sk, $\langle m_1, \ldots, m_{a+b} \rangle$): At random $r \leftarrow \mathbb{Z}^*_p$ is picked, $R = g^r$, $S = g^{z-rv} \prod_{i=1}^{a} m_i^{-w_i}$ and $T = (\tilde{g} \prod_{i=1}^{b} m_{a+i}^{-u_i})^{1/r}$ are computed and the signature (R, S, T) is outputted.

VfSig(sk, $\langle m_1, \ldots, m_{a+b} \rangle$): The signature s is parsed as (R, S, T) and 1 is outputted if the equalities $e(R,V)e(S, \tilde{g}) \prod_{i=1}^{a} e(m_i, W_i) = e(g, Z)$ and $e(R,T) \prod_{i=1}^{b} e(U_i, m_{a+1}) = e(g, \tilde{g})$ hold.

A commitment may be used for a zero-knowledge proof of knowledge. A protocol proving knowledge of exponents $w_1, \ldots, w_n$ satisfying the formula $\phi(w_1, \ldots, w_n)$ may be described as $^K w_1, \ldots, w_n : \phi(w_1, \ldots, w_n)$. The symbol "$^K$" used instead of "$\exists$" indicates that "knowledge" of the exponents rather than just their existence is proven. The formula $\phi(w_1, \ldots, w_n)$ consists of conjunctions and disjunctions of "atoms". An atom expresses group relations, such as $\prod_{j=1}^{k} g_j^{\mathcal{F}_j} = 1$, where the $g_j$ are elements of prime order groups and the $\mathcal{F}_j$'s are polynomials in the variables $w_1, \ldots, w_n$.

A witness for a statement of the form $^K w_1, \ldots, w_n : \phi(w_1, \ldots, w_n)$ is a tuple $(w_1, \ldots, w_n)$ of integers such that $\phi(w_1, \ldots, w_n, \text{bases})$ holds. In cases where only the residue class of $w_i$ modulo m is important, we may treat the domain of $w_i$ as $\mathbb{Z}_m$.

The formula $\phi(w_1, \ldots, w_n, \text{bases})$ is given by a formula that is built up from "atoms" using arbitrary combinations of ANDs and ORs. An atom may express several types of relations among the $w_i$'s: (i) integer relations, such as $\mathcal{F} = 0$, $\mathcal{F} \geq 0$, $\mathcal{F} \equiv 0 \pmod{m}$, or $\gcd(\mathcal{F}, m) = 1$, where $\mathcal{F}$ is an integer polynomial in the variables $w_1, \ldots, w_n$, and m is a positive integer; (ii) group relations, such as $\Pi_{j=1}^{k} g_j^{\mathcal{F}_j} = 1$, where $g_j \in$ bases are elements of an abelian group, and the $\mathcal{F}_j$'s are integer polynomials in the variables $w_1, \ldots, w_n$.

Extended zero-knowledge formulas: A proof system for $^k w_1, \ldots, w_n : \phi(w_1, \ldots, w_n)$ may be transformed into a proof system for more expressive statements about secret exponents $(w_i)_i$=sexps and secret bases $(g_i)_i$=sbases:$^K$sexps, sbases:$\phi$(sexps, bases ∪sbases). The transformation uses a blinded base $g'^i = g_i h^{\rho_i}$ for every $g_i$. It adds h and all $g'_i$ to the public bases, $\rho_i$ to the secret sexps, and rewrites $g_j^{\mathcal{F}_j}$ into $g_i'^{\mathcal{F}_j} h^{-\mathcal{F}_j \rho_i}$ for all i, j.

This proof system supports pairing product equations $\Pi_{i=1}^{k} e(g_i, \tilde{g}_i)^{\mathcal{F}_j} = 1$ in groups of prime order $|\mathbb{G}|$ with a bilinear map $e: \mathbb{G} \times \widetilde{\mathbb{G}} \to \mathbb{G}_t$, by treating the target group as the group of the proof system. For simplicity, it may be focused on the special case of i=j. The embedding for secret bases is unchanged, except for the case in which both bases in a pairing are secret. In the latter case, $e(g_j, \tilde{g}_j)^{\mathcal{F}_j}$ needs to be transformed into $e(g_j', \tilde{g}_j')^{\mathcal{F}_j} e(g_j', \tilde{h})^{-\mathcal{F}_j \rho_j} e(h, \tilde{g}_j')^{-\mathcal{F}_j \tilde{\rho}_j} e(h, \tilde{h})^{-\mathcal{F}_j \rho_j \tilde{\rho}_j}$.

A proof instance ins may be defined to consist of the set of bases and descriptions of the groups. The proof relation ((sexps, sbases), ins) ∈ R holds if and only if the formula $\phi$(sexps, bases ∪ sbases) holds. A relation R is called tractable, if such a formula $\phi$ and consequently an efficient proof protocol for it exists.

According to an example, the revocation computer system receives revocation information and initializes a vector x. To each revocation handle $rh_i$, i.e. to each credential $s_i$, a bit-vector element x[i] of bit length m is assigned by the revocation computer system. Each bit x[i,j] indicates whether the corresponding credential $s_i$ is valid for verifying computer system $\mathcal{V}_j$ (x[i,j]=1), i.e. the hardware and/or software functions offered by $\mathcal{V}_j$, or revoked (x[i,j]=0).

The time is divided into epochs ep, i.e. discrete time intervals, so that the revocation computer system provides user computer devices and verifying computer systems with updated revocation information at the beginning of each epoch, i.e. time interval. The time intervals may be isochronous. The revocation computer system provides each user computer device $\mathcal{U}$ with revocation information ri[ep, i] regarding the corresponding credential $s_i$ and verifying computer systems $\mathcal{V}_1, \ldots, \mathcal{V}_m$ with revocation verification information rvi[ep] regarding all credentials $s_1, \ldots, s_n$. This information allows user computer devices to prove the revocation status of their credentials $s_i$ and verifying computer systems to verify this status.

A user computer device $\mathcal{U}_i$ employs a credential $s_i$ to compute a presentation token tk for verifying computer system $\mathcal{V}_j$ that shows that issuing computer system I certified the value of the attributes $(a_{i,1}, \ldots, a_{i,l})$ signed by $s_i$.

To compute a presentation token tk, user computer device $\mathcal{U}_i$ also employs the revocation information ri[ep, i] to prove the validity of the corresponding credential $s_i$, by which revocation handle $rh_i$ has been signed, with respect to verifying computer system $\mathcal{V}_j$. Verifying computer system $\mathcal{V}_j$ employs the revocation verification information rvi[ep] to verify tk.

The algorithms for handling revocation statuses of credential run by issuing computer system I, revocation computer system $\mathcal{R}$, user computer devices $\mathcal{U}_1, \ldots, \mathcal{U}_n$ and verifying computer systems $\mathcal{V}_1, \ldots, \mathcal{V}_m$ may for example be defined as follows:

ISetup($1^k$): On input the security parameter $1^k$ a secret key Isk and a public key Ipk are generated and outputted.

RSetup($1^k$): On input the security parameter $1^k$ revocation parameters $par_r$ are generated and outputted. Furthermore, revocation information ri[$ep_0$, i] (i∈[1, n]) is generated and outputted. Revocation information ri[$ep_0$, i] contains a bit-vector element comprising the revocation status of credential with revocation handle i at starting epoch $ep_0$ for each function. Revocation status information rvst[$ep_0$] is initialized and outputted, i.e. a vector of with n vector element, each of said elements with a sequence of bits of bit length m. Provisional revocation status information rvst=rvst[$ep_0$] is initialized and outputted as well as revocation verification information rvi[$ep_0$] containing a single value derived from the revocation status information rvst[$ep_0$].

IssueCred(Isk, $a_{i,1}, \ldots, a_{i,n}$, i): On input of the secret key Isk, the attributes ($a_{i,1}, \ldots, a_{i,l}$) and the revocation handle i, a credential $s_i$ is generated and outputted.

VfCred (Ipk, $a_{i,1}, \ldots, a_{i,n}$, i, $s_i$): On input of the public key Ipk, the attributes ($a_{i,1}, \ldots, a_{i,l}$), the revocation handle i, and the credential $s_i$, 1 is outputted, if the credential is valid, and 0 otherwise.

UpdateUser ($rvst_i$, rvst): On input of revocation status information $rvst_i$ for revocation handle i, the provisional revocation status information is updated and the updated provisional revocation status information rvst' outputted.

UpdateEpoch ($par_r$, ri[$ep_t$, i], rvi[$ep_t$], rvst[$ep_t$], rvst): On inputting the revocation parameters $par_r$, revocation information ri[$ep_t$, i] (i∈[1, n]), revocation verification information rvi[$ep_t$], revocation status information rvst[$ep_t$], and provisional revocation status information rvst of epoch $ep_t$, updated information for the next epoch $ep_{t+1}$ is outputted, i.e. ri[$ep_{t+1}$, i] (i∈[1, n]), rvi[$ep_{t+1}$], rvst[$ep_{t+1}$], and rvst=rvst[$ep_{t+1}$] are outputted.

CreatToken(Ipk, $par_r$, $a_{i,1}, \ldots a_{i,n}$, i, $s_i$, ri[$ep_t$, i], $\mathcal{V}_j$): On input of the public key Ipk, the revocation parameters $par_r$, the attributes ($a_{i,1}, \ldots, a_{i,l}$), revocation handle i, credential $s_i$, revocation information ri[$ep_t$, i], and identifier of verifying computer system $\mathcal{V}_j$, a presentation token tk for verifying computer system $\mathcal{V}_j$ is generated and outputted.

VfToken (Ipk, $par_r$, tk, rvi[$ep_t$], $\mathcal{V}_j$): On inputting the public key Ipk, the revocation parameters $par_r$, the presentation token tk, and the revocation verification information rvi[$ep_t$], and the identifier of verifying computer system $\mathcal{V}_j$, 1 is outputted, if the presentation token tk is valid, and 0 otherwise.

Figure 6:
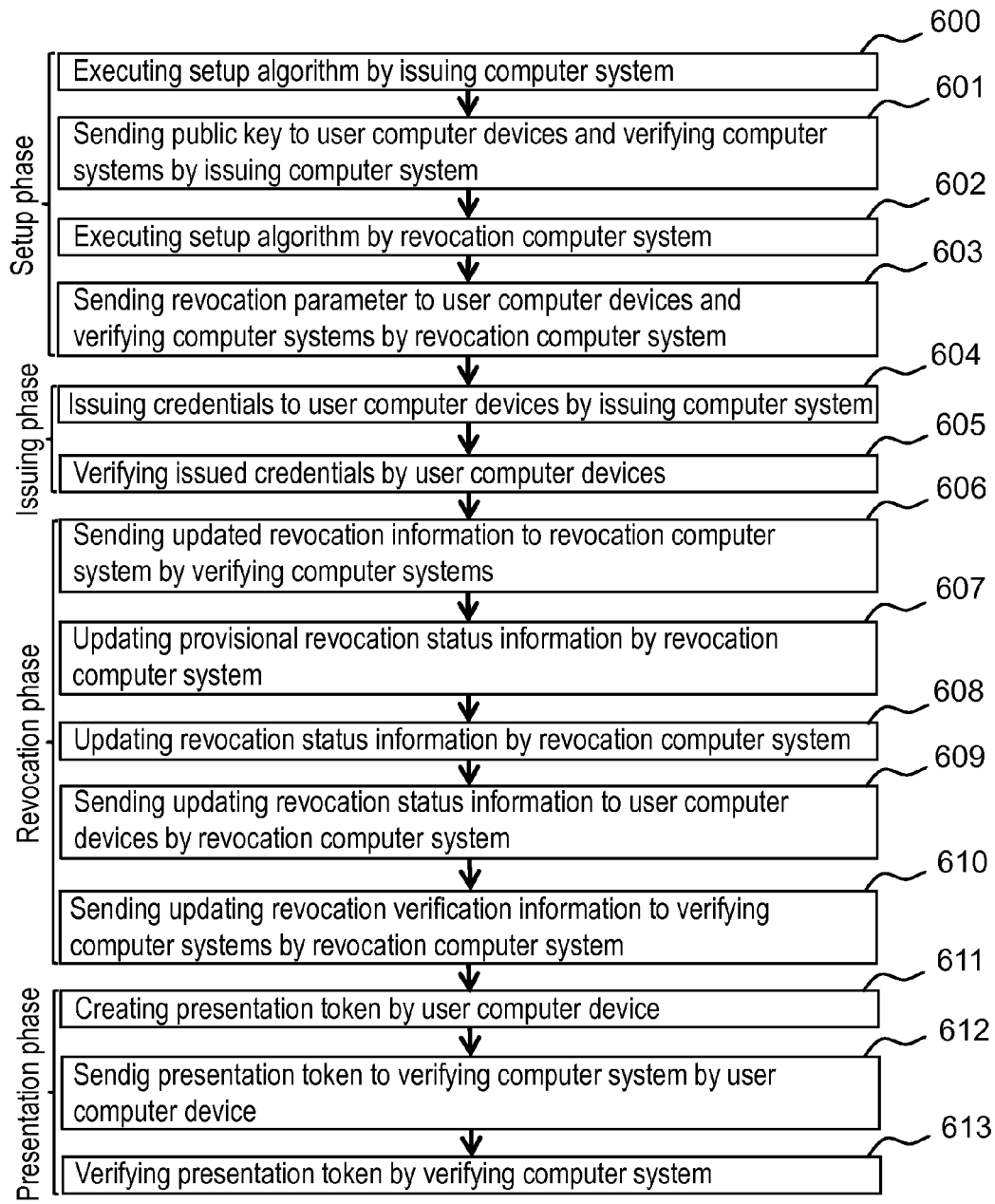
FIG. 6 depicts a flow diagram of a method according to embodiments of the invention.

FIG. 6 shows a general flow diagram according to embodiments of the present invention. The issuing computer system I, the revocation computer system $\mathcal{R}$, the user computer devices $\mathcal{U}_1, \ldots, \mathcal{U}_n$ and the verifying computer systems $\mathcal{V}_1, \ldots, \mathcal{V}_m$ may run the algorithms as follows:

The first phase is the setup phase (steps 600-603): In step 600, the issuing computer system I executes the setup algorithm (Isk, Ipk)←ISetup($1^k$) and in step 601 sends Ipk to user computer devices $\mathcal{U}_1, \ldots, \mathcal{U}_n$ and verifying computer systems $\mathcal{V}_1, \ldots, \mathcal{V}_m$. In step 602 the revocation computer system $\mathcal{R}$ executes the algorithm ($par_r$, ⟨ri[$ep_0$, i]⟩$_{i=1}^{n}$, rvi[$ep_0$], rvst[$ep_0$], rvst)←RSetup($1^k$)

and in step 603 sends $par_r$ to user computer devices $\mathcal{U}_1, \ldots, \mathcal{U}_n$ and verifying computer systems $\mathcal{V}_1, \ldots, \mathcal{V}_m$.

The second phase is the issuing phase (steps 604-605): In step 604, the issuing computer system I runs $s_i \leftarrow$ IssueCred(Isk, $a_{i,1}, \ldots, a_{i,n}$, i) and sends the specific information ($a_{i,1}, \ldots, a_{i,n}$, i, $s_i$) assigned to revocation handle i to user computer device $\mathcal{U}_i$, to possessing the credential to which i is assigned. In step 605, user computer device $\mathcal{U}_i$ runs b←VfCred (Ipk, $a_{i,1}, \ldots, a_{i,n}$, i, $s_i$) and accepts the credential $s_i$, if b=1.

The third phase is the revocation phase (steps 606-611): In step 606, issuing computer system I (or one of the verifying computer systems $\mathcal{V}_1, \ldots \mathcal{V}_m$) sends updated revocation information $rvst_i$ about a credential $s_i$ with revocation handle i to the revocation computer system $\mathcal{R}$. In step 607, the revocation computer system $\mathcal{R}$ runs rvst'←UpdateUser(rvst$_i$,rvst) to obtain updated provisional revocation status information rvst' based on the updated revocation information $rvst_i$ provided. At the beginning of a new epoch $ep_{t+1}$, $\mathcal{R}$ performs step 608 and runs $(\langle ri[ep_{t+1}, i]\rangle_{i=1}^n$, rvi[$ep_{t+1}$], rvst[$ep_{t+1}$],rvst)←UpdateEpoch($par_r$, ri[$ep_t$, i], rvi [$ep_t$], rvst[$ep_t$], rvst). In step 609, the revocation computer system $\mathcal{R}$ sends to each user computer device $\mathcal{U}_i$ the corresponding revocation information ri[$ep_{t+1}$, i] assigned to revocation handle i and in step 610 the general revocation verification information rvi[$ep_{t+1}$] to all the verifying computer systems $\mathcal{V}_1, \ldots, \mathcal{V}_m$.

The fourth phase is the presentation phase (steps 611-613): In step 611, the user computer device $\mathcal{U}_i$ runs tk←CreatToken (Ipk, $par_r$, $a_{i,1}, \ldots, a_{i,n}$, i, $s_i$, ri[$ep_t$, i], $\mathcal{V}_j$) and in step 612 sends the presentation token tk to a verifying computer system $V_j$. Upon receiving the presentation token tk, the verifying computer system $V_j$ in step 613 runs b←VfToken (Ipk, $par_r$, tk, rvi[$ep_t$], $\mathcal{V}_j$) and accepts the presentation token tk, if b=1.

Non-Hiding Commitment

In an embodiment of the invention a non-hiding commitment value, i.e. single value commitment, to a vector is applied. A non-hiding single value commitment with update scheme allows to succinctly commit to a vector x=(x[1], . . . , x[n]) ∈ $\mathcal{M}^n$ such that it is possible to compute an opening w to x[i] with the size of w independent of i and n. It is also possible to update the commitment value by replacing the value x[i] by a new value x[i]'. The scheme consists of the following algorithms:

Setup ($1^k$, $\ell$): On input the security parameter $1^k$ and an upper bound $\ell$ on the size of the vector x, the parameters of the commitment scheme par are generated, which include a description of the message space $\mathcal{M}$.

Commit(par, x): On input a vector x∈$\mathcal{M}^n$, a commitment value com to x is outputted.

Prove(par, i, x): Computes a witness value w for x[i].

Verify(par, com, x, i, w): Outputs 1, if w is a valid witness value for x being at position i and 0 otherwise.

ComUpd (par, com, j, x, x'): On inputting a commitment value com with value x at position j, outputs a commitment value com' with value x' at position j, while the other positions remain unchanged.

WitUpd(par, w, i, j, x, x'): On input of a witness value w for position i valid for a commitment value com with value x at position j, a witness value w' for position i valid for a commitment value com' with value x' at position j is outputted.

A non-hiding vector commitment scheme should be correct and binding. Correctness requires that for par←Setup ($1^k$, $\ell$), x=(x[1], . . . , x[n]) ∈$\mathcal{M}^n$, com←Commit(par, x), i∈[1, n] and w←Prove(par, i, x), the algorithm Verify(par, com, x[i], i, w) outputs 1 with probability 1.

The binding property requires that no adversary can output a vector based commitment value com, a position i∈[1, $\ell$], two values x and x' and two respective witness values w and w' such that Verify accepts both, i.e. for 1 polynomial in k:

$$Pr\left[\begin{array}{l} par \leftarrow \text{Setup}(1^k, \ell); \\ (com, i, x, x', w, w') \leftarrow \mathcal{A}(par): \\ \text{Verify}(par, com, x, i, w) = 1 \wedge \\ \text{Verify}(par, com, x', i, w') = 1 \wedge x \neq x' \wedge i \in [1, \ell] \end{array}\right] \leq \epsilon(k).$$

A non-hiding vector commitment scheme may for example be constructed as follows:

Setup ($1^k$, $\ell$): Groups (p, $\mathbb{G}$, $\widetilde{\mathbb{G}}$, $\mathbb{G}_t$, e, g, $\tilde{g}$)← $\mathcal{G}(1^k)$ are generated, $\alpha \leftarrow \mathbb{Z}_p$ picked and ($g_1, \tilde{g}_1, \ldots, g_l, \tilde{g}_l$, $g_{l+2}, \ldots, g_{2l}$) computed, where $g_i = g^{(\alpha^i)}$ and $\tilde{g}_i = \tilde{g}^{(\alpha^i)}$. Parameters par=(p, $\mathbb{G}$, $\widetilde{\mathbb{G}}$, $\mathbb{G}_t$, e, g, $\tilde{g}$, $g_1, \tilde{g}_1, \ldots, g_l, \tilde{g}_l$, $g_{l+2}, \ldots, g_{2l}$, $\mathcal{M} = \mathbb{Z}_p$) are outputted.

Commit(par, x): Outputs com=$\Pi_{j=1}^n g_{l+1-j}^{x[j]} = g_l^{x[1]} \ldots g_{l+1-n}^{x[n]}$ with |x|=n≤ $\ell$.

Prove (par, i, x): Outputs w=$\Pi_{j=1, j\neq i}^n g_{l+1-j+i}^{x[j]}$ with |x|=n≤ $\ell$.

Verify (par, com, x, i, w): Outputs 1, if e(com, $\tilde{g}_i$)=e(w, $\tilde{g}_i$)·e($g_1, \tilde{g}_l$)$^x$.

ComUpd (par, com, j, x, x'): Outputs the updated commitment value $$com' = com \cdot \frac{g_{\ell+1-j}^{x'}}{g_{\ell+1-j}^{x}} = com \cdot g_{\ell+1-j}^{x'-x}.$$

WitUpd(par, w, i, j, x, x'): Outputs w, if i=j. Otherwise the updated witness value $$w' = w \cdot \frac{g_{\ell+1-j+i}^{x'}}{g_{\ell+1-j+i}^{x}} = w \cdot g_{\ell+1-j+i}^{x'-x}$$

is outputted.

This commitment scheme is correct and binding under the l-DHE assumption. Correctness requires:

$$\frac{e(com, \tilde{g}_i)}{e(w, \tilde{g})} = \frac{e\left(g^{\sum_{j=1}^n x[j](\alpha^{\ell+1-j})}, \tilde{g}^{(\alpha^i)}\right)}{e\left(g^{\sum_{j=1, j\neq i}^n x[j](\alpha^{\ell+1-j+i})}, \tilde{g}\right)}$$

$$= \frac{e\left(g^{\sum_{j=1}^n x[j](\alpha^{\ell+1-j+i})}, \tilde{g}\right)}{e\left(g^{\sum_{j=1, j\neq i}^n x[j](\alpha^{\ell+1-j+i})}, \tilde{g}\right)}$$

$$= e(g, \tilde{g})^{x[i](\alpha^{\ell+1})}$$

$$= e(g_1, \tilde{g}_\ell)^{x[i]}$$

This vector based commitment scheme also fulfills the binding property under the $\ell$-DHE assumption. Given an adversary $\mathcal{A}$ that breaks the binding property with non-negligible probability v, an algorithm $\mathcal{T}$ may be constructed that breaks the $\ell$-DHE assumption with non-negligible probability v. First, $\mathcal{T}$ receives an instance (e, $\mathbb{G}$, $\widetilde{\mathbb{G}}$, $\mathbb{G}_t$, e, g, $\tilde{g}$, $g_1$, $\tilde{g}_1$, . . . , $g_l$, $\tilde{g}_l$, $g_{l+2}$, . . . , $g_{2l}$) of the $\ell$-DHE assumption. Algorithm $\mathcal{T}$ sets par=(e, $\mathbb{G}$, $\widetilde{\mathbb{G}}$, $\mathbb{G}_t$, e, g, $\tilde{g}$, $g_1$, $\tilde{g}_1$, . . . , $g_l$, $\tilde{g}_l$, $g_{l+2}$, . . . , $g_{2l}$) and sends par to adversary $\mathcal{A}$. Adversary $\mathcal{A}$ returns (com, i, x, x', w, w') such that Verify (par, com, x, i, w)=1, Verify(par, com, x', i, w')=1, and x≠x'. Algorithm $\mathcal{T}$ computes $g_{l+1}$ as follows:

$$e(w,\tilde{g})e(g_1,\tilde{g}_l)^x = e(w',\tilde{g})e(g_1,\tilde{g}_l)^{x'}$$

$$e(w/w',\tilde{g}) = e(g_1,\tilde{g}_l)^{x'-x}$$

$$e((w/w')^{1/(x'-x)},\tilde{g}) = e(g_1,\tilde{g}_l)$$

$$e((w/w')^{1/(x'-x)},\tilde{g}) = e(g_{l+1},\tilde{g}_l)$$

The last equation implies that $g_{l+1} = (w/w')^{1/(x'-x)}$. Therefore, algorithm $\mathcal{T}$ returns $(w/w')^{1/(x'-x)}$ as a solution for the l-DHE problem.

For a commitment value com to a vector of length n, a ZKPK of a commitment opening $^K$i, w: Verify(par, com, x, i, w)=1 ∧ i∈[i, n] may be computed. This involves proving knowledge of a position i and a witness value w such that the verification equation (com, $\tilde{g}_i$)=e(w, $\tilde{g}$)·e($g_1$, $\tilde{g}_l$)$^x$ holds. Additionally, it involves proving that com is opened to a correct position i∈[i, n].

As a is secret, the relation between $\tilde{g}_i = \tilde{g}^{(\alpha^i)}$ and i are not efficiently provable. For this reason a structure preserving signature $\sigma_i$ to sign the triple ($g^{id}$, $g^i$, $\tilde{g}_i$) may be employed. The integer id is an identifier of the vector based commitment value, which is needed in case the revocation mechanism employs more than one commitment values.

A prover proves possession of a signature on ($g^{id}$, $g^i$, $\tilde{g}_i$) and of a witness value w such that (com, $\tilde{g}_i$)=e(w, $\tilde{g}$)·e($g_1$, $\tilde{g}_l$)$^x$ holds. The prover proves equality between $\tilde{g}_i$ in the signature $\sigma_i$ and in the verification equation.

$$^K g^i, \tilde{g}_i, w, R, S, T:$$

$$e(R,V)e(S,\tilde{g})e(g^{id},W_1)e(g^i,W_2)e(g,Z)^{-1}=1 \wedge$$

$$e(R,T)e(U_1,\tilde{g}_i)e(g,\tilde{g})^{-1}=1 \wedge$$

$$e(com,\tilde{g}_i)e(w,\tilde{g}^{-1})=e(g_1,\tilde{g}_l)^x$$

The first two of the above equations for (R, S, T) prove possession of a signature (R, S, T) on ($g^{id}$, $g^i$, $\tilde{g}_i$), while the last equation proves knowledge of the witness value w. Note that, in this proof, the message $g^{id}$ and the committed value x are revealed.

With n being the number of user computer devices that possessing a credential of a certain type and m being the number of revocation lists related to that credential type, the revocation computer system $\mathcal{R}$ sets a vector x=(x[1], . . . , x[n]). The component x[i] consists of m bits and is associated to revocation handle i∈[1, n] and thus to user computer device $\mathcal{U}_i$ possessing credential $s_i$. By x[i, j] the jth bit (j ∈ [1, m]) of the component x[i]. x[i, j]=1 denotes that the credential with revocation handle i is valid according to revocation list j, while x[i, j]=0 indicates that the credential is revoked. Therefore, x[i]=0 denotes that the credential is revoked in all the revocation lists.

The issuing computer system I employs a signature scheme (IKeyGen, Sign, VfSig) and the revocation computer system $\mathcal{R}$ employs a signature scheme (RKeyGen, RSign, RVfSig).

In case of this exemplary non-hiding commitment scheme, algorithms for handling revocation statuses of credential may be instantiated as follows:

ISetup($1^k$): On input of the security parameter $1^k$, (Isk, Ipk)←KeyGen($1^k$) is run and a secret key Isk and a public key Ipk outputted.

RSetup($1^k$): On input of the security parameter $1^k$, par←RSetup($1^k$, 1) and (Rsk, Rpk)←RKeyGen($1^k$) are run. A vector x=(0, . . . , 0) of size n is initialized. com←Commit (par,x) is run and, for i=1 to n, $w_i$←Prove(par, i, x) and $\sigma_i$←RSign(Rsk, ⟨$g^{id}$, $g^i$, $\tilde{g}_i$⟩) are run. Parameters $par_r$=(par, Rpk), revocation information ri[$ep_0$, i]=(x[i], com, $w_i$, $\sigma_i$) (i∈[1, n]), revocation verification information rvi[$ep_0$]=com, revocation status information rvst[$ep_0$]=x and provisional revocation status information rvst=rvst[$ep_0$]=x are outputted.

IssueCred(Isk, $a_{i,1}$, . . . , $a_{i,n}$, i): On inputting the secret key Isk, the attributes ($a_{i,1}$, . . . , $a_{i,n}$), and the revocation handle i, $s_i$←Sign(Isk, ⟨$a_{i,1}$, . . . , $a_{i,n}$, i⟩) is run and a credential $s_i$ outputted.

VfCred(Ipk, $a_{i,1}$, . . . , $a_{i,n}$, i, $s_i$): On input of the public key Ipk, the attributes ($a_{i,1}$, . . . , $a_{i,n}$), the revocation handle i, and the credential $s_i$, it outputs b←VfSig(Ipk, $s_i$, m).

UpdateUser($rvst_i$, rvst): On input revocation status information $rvst_i$ for revocation handle i and the provisional revocation information rvst=(x[1], . . . , x[n]), $rvst_i$ is parsed as the component x'[i] and updated provisional revocation status information rvst'=(x[1], . . . , x[i−1], x'[i], x[i+1], . . . , x[n]) is outputted.

UpdateEpoch($par_r$, ri[$ep_t$, i], rvi[$ep_t$], rvst[$ep_t$], rvst): On input of the revocation parameters $par_r$=(par, Rpk), revocation information ri[$ep_t$, i]=(x[i], com, w, $\sigma_i$) (i∈[1, n]), revocation verification information rvi[$ep_t$]=com, revocation status information rvst[$ep_t$]=x, and provisional revocation status information rvst=x', for all j such that x[j]≠x'[j], com'←ComUpd(par, com, j, x[j], x'[j]) is run and for all i∈[1,n], if i≠ j, $w'_i$←WitUpd(par, $w_i$, i, j, x[j], x'[j]) is run. Revocation information ri[$ep_{t+1}$, i]=(x'[i], com', $w'_i$, $\sigma_i$) (i∈[1, n]), revocation verification information rvi[$ep_{t+1}$]= com', revocation status information rvst[$ep_{t+1}$]=x' and provisional revocation status information rvst=x' are outputted.

CreatToken(Ipk, $par_r$, $a_{i,1}$, . . . , $a_{i,n}$, i, $s_i$, ri[$ep_t$, i], $\mathcal{V}_j$): On input of the public key Ipk, the revocation parameters $par_r$, the attributes ($a_{i,1}$, . . . , $a_{i,n}$), the revocation handle i, the credential $s_i$, the revocation information ri[$ep_t$, i]=(x[i], com, $w_i$, $\sigma_i$) (i∈[1, n]), and the identifier of verifying computer system $\mathcal{V}_j$, it computes the following zero-knowledge proof of knowledge:

$$^K s_i, a_1, \ldots, a_l, i, w:$$

$$VfSig(Ipk, s_i, \langle a_i, \ldots, a_l, i \rangle) = 1 \wedge$$

Verify(par,com,x[i],i,$w_i$)=1

Instantiated with the above identified building-blocks, the proof may be as follows:

$$^K s_i, a_1, \ldots, a_l, i, \tilde{g}_i, w_i, R, S, T:$$

$$VfSig(Ipk, s_i, \langle a_i, \ldots, a_l, i \rangle) = 1 \wedge$$

$$e(R,V)e(S,\tilde{g})e(g,W_1)^{id}e(g,W_2)^i e(g,Z)^{-1}=1 \wedge$$

$$e(R,T)e(U_1,\tilde{g}_i)e(g,\tilde{g})^{-1}=1 \wedge$$

$$e(com,\tilde{g}_i)^{-1} e(w_i,\tilde{g})e(g_1,\tilde{g}_l)^{x[i]}=1$$

A presentation token tk is outputted, which consists of the proof and the revocation information x[i].

VfToken (Ipk, $par_r$, tk, rvi[$ep_t$], $\mathcal{V}_j$): On input the public key Ipk, the revocation parameters $par_r$, the presentation token tk, and the revocation verification information rvi[$ep_t$], and the identifier of verifying computer system $\mathcal{V}_j$, verify the proof in the presentation token tk and output 1, if it is valid, and 0 otherwise.

Hiding Commitment

A hiding vector based commitment scheme according to a further embodiment may consist of the following algorithms:

Setup($1^k$, $\ell$): On input of the security parameter $1^k$ and an upper bound $\ell$ on the size of the vector, parameters of the commitment scheme par are generated, which include a description of the message space $\mathcal{M}$ and a description of the randomness space $\mathcal{R}$.

Commit(par, x, r): On input of a vector $x \in \mathcal{M}^n$ ($n \le \ell$) and $r \in \mathcal{R}$ a commitment value com to x is outputted.

Prove (par, i, x, r): Computes a witness value w for x[i].

Verify(par, com, x, i, w): Outputs 1, if w is a valid witness value for x being at position i, and 0 otherwise.

ComUpd(par, com, j, x, r, x', r'): On input of a commitment value com with value x at position j and randomness r, a commitment value com' with value x' at position j and randomness r' is outputted, while the other positions remain unchanged.

WitUpd(par, w, j, x, r, x', r'): On input of a witness value w for position i valid for a commitment value com with value x at position j and randomness r, a witness value w' for position i valid for a commitment value com' with value x' at position j and randomness r' is outputted.

A vector based commitment scheme is required to be correct, hiding, and binding.

Correctness requires that for par←Setup($1^k$, $\ell$), x=(x[1], . . . , x[n])$\in \mathcal{M}^n$, r←$\mathcal{R}$, com←Commit(par, x, r), i∈[1,n] and $w_i$←Prove(par, i, x, r), the algorithm Verify (par, com, x[i], i, w) outputs 1 with probability 1.

The hiding property requires that any PPT adversary $\mathcal{A}$ has negligible advantage in the following game. Adversary $\mathcal{A}$ chooses a vector and a position i' and sends them to a challenger. The challenger either commits to the vector sent by adversary $\mathcal{A}$ or to a vector where the i'th component being replaced by a random message. The challenger sends the commitment value to adversary $\mathcal{A}$ along with witness values for all the vector components except of i'. Adversary $\mathcal{A}$ guesses which vector has been used to compute the commitment value. More formally, for $\ell$ polynomial in k:

$$\Pr\left[\begin{array}{l} par \leftarrow \text{Setup}(1^k, \ell); (i', x_0, st) \leftarrow \mathcal{A}(par); x' \leftarrow \mathcal{M}; \\ x_1 = (x_0[1], \ldots, x_0[i-1], x', x_0[i+1], \ldots, x_0[n]); \\ b \leftarrow \{0, 1\}; r \leftarrow \mathcal{R}; \\ com \leftarrow \text{Commit}(par, x_b, r); \\ \{w_i \leftarrow \text{Prove}(par, i, x_b, r)\}_{i=1, i \ne i'}^n; \\ b' \leftarrow \mathcal{A}(st, com, \{w_i\}_{i=1, 1 \ne i'}^n): \\ b = b' \end{array}\right] = \frac{1}{2} + \epsilon(k)$$

The binding property may be defined according to the definition given above.

A hiding vector commitment scheme may for example be constructed as follows:

Setup ($1^k$, $\ell$): Groups (p, $\mathbb{G}$, $\tilde{\mathbb{G}}$, $\mathbb{G}_t$, e, g, $\tilde{g}$)←$\mathcal{G}(1^k)$ are generated, $\alpha$←$\mathbb{Z}_p$ is picked and ($g_1$, $\tilde{g}_1$, . . . , $g_l$, $\tilde{g}_l$, $g_{l+2}$, . . . , $g_{2l}$) computed, where $g_i = g^{(\alpha^i)}$ and $\tilde{g}_i = \tilde{g}^{(\alpha^i)}$. Parameters par=(p, $\mathbb{G}$, $\tilde{\mathbb{G}}$, $\mathbb{G}_t$, e, g, $\tilde{g}$, $g_1$, $\tilde{g}_1$, . . . , $g_l$, $\tilde{g}_l$, $g_{l+2}$, . . . , $g_{2l}$, $\mathcal{M}, = \mathbb{Z}_p$, $\mathcal{R}, = \mathbb{Z}_p$) are outputted.

Commit(par, x, r): Outputs com=$g^r \cdot \Pi_{j=1}^n g_{l+1-j}^{x[j]}$=$g^r \cdot g_l^{x[1]} \ldots g_{l+1-n}^{x[n]}$ with $|x|=n \le \ell$.

Prove(par, i, x, r): Outputs w=$g^r \cdot \Pi_{j=1, j \ne i}^n g_{l+1-j+i}^{x[j]}$ with $|x|=n \le \ell$.

Verify(par, com, x, i, w): Outputs 1, if e(com, $\tilde{g}_i$)=e(w, $\tilde{g}$)·e($g_1$, $\tilde{g}_l$)$^x$, and else 0.

ComUpd(par, com, j, x, r, x', r'): Outputs the updated commitment value $$com' = com \cdot \frac{g^{r'} \cdot g_{l+1-j}^{x'}}{g^r \cdot g_{l+1-j}^x} = com \cdot g^{r'-r} \cdot g_{l+1-j}^{x'-x}.$$

WitUpd (par, w, i, j, x, r, x', r'): Outputs w, if i=j, otherwise the updated witness value $$w' = w \cdot \frac{g^{r'} \cdot g_{l+1-j+i}^{x'}}{g^r \cdot g_{l+1-j+i}^x} = w \cdot g^{r'-r} \cdot g_{l+1-j+i}^{x'-x}$$

is outputted.

This commitment scheme is correct, hiding, and binding under the l-DHE assumption. Correctness may be proven as follows:

$$\frac{e(com, \tilde{g}_i)}{e(w, \tilde{g})} = \frac{e\left(g^{r+\sum_{j=1}^n x[j](\alpha^{l+1-j})}, \tilde{g}^{(\alpha^i)}\right)}{e\left(g^{r(\alpha^i)+\sum_{j=1, j \ne i}^n x[j](\alpha^{l+1-j+i})}, \tilde{g}\right)}$$

$$= \frac{e\left(g^{r(\alpha^i)+\sum_{j=1}^n x[j](\alpha^{l+1-j+i})}, \tilde{g}\right)}{e\left(g^{r(\alpha^i)+\sum_{j=1, j \ne i}^n x[j](\alpha^{l+1-j+i})}, \tilde{g}\right)}$$

$$= e(g, \tilde{g})^{x[i](\alpha^{l+1})}$$

$$= e(g_1, \tilde{g}_l)^{x[i]}$$

This vector based commitment scheme is further a hiding scheme. The proof of the binding property follows the proof outlined above.

A ZKPK of a commitment opening $^K$x, i, w: Verify(par, com, x, i, w)=1 ∧ i∈[i, n] is computed. Unlike before in case of the exemplary non-hiding scheme, in this proof the committed value x is hidden. A proof similar to the one described before may be employed. The only difference is that x is not revealed to the verifying computer system.

$K_{x, g^i, \tilde{g}_i, w, R, S, T}$:

$e(R,V)e(S,\tilde{g})e(g^{id}, W_1)e(g^i, W_2)e(g, Z)^{-1} = 1$ ∧

$e(R,T)e(U_1, \tilde{g}_i)e(g, \tilde{g})^{-1} = 1$ ∧

$e(com, \tilde{g}_i)e(w, \tilde{g}^{-1})e(g_1^{-1}, \tilde{g}_l)^x = 1$

In case of this exemplary hiding commitment scheme, algorithms for handling revocation statuses of credential may be instantiated as follows:

ISetup($1^k$): On input of the security parameter $1^k$, (Isk, Ipk)←IKeyGen($1^k$) run and outputted a secret key Isk and a public key Ipk.

RSetup($1^k$): On input of the security parameter $1^k$, par←RSetup($1^k$, $\ell$) and (Rsk, Rpk)←RKeyGen ($1^k$) are run. A vector x=(0, . . . , 0) of size n is initialized. r←$\mathcal{R}$ is picked. com←Commit(par, x, r) is run and, for i=1 to n, $w_i$←Prove(par, i, x, r) and $\sigma_i$←RSign(Rsk, $\langle g^{id}, g^i, \tilde{g}_i \rangle$) are run. Parameters $par_r$=(par, Rpk), revocation information ri[$ep_0$, i]=(x[i], com, $w_i$, $\sigma_i$) (i∈[1, n]), revocation verification information rvi[ep$_0$]=com, revocation status information rvst[ep$_0$]=(r, x) and provisional revocation status information rvst=rvst[ep$_0$]=x are outputted.

IssueCred(Isk, a$_{i,1}$, ..., a$_{i,n}$, i): On inputting the secret key Isk, the attributes (a$_{i,1}$, ..., a$_{i,n}$), and the revocation handle i, s$_i$←Sign(Isk, ⟨a$_{i,1}$, ..., a$_{i,n}$, i⟩) is run and a credential s$_i$ outputted.

VfCred(Ipk, a$_{i,1}$, ..., a$_{i,n}$, i, s$_i$): On input of the public key Ipk, the attributes (a$_{i,1}$, ..., a$_{i,n}$), the revocation handle i, and the credential s$_i$, it outputs b←VfSig(Ipk, s$_i$, m).

UpdateUser(rvst$_i$, rvst): On input of revocation status information rvst$_i$ for revocation handle i and the provisional revocation information rvst=(x[1], ..., x[n]), rvst$_i$ is parsed as the component x'[I] and updated provisional revocation status information rvst'=(x[1], ..., x[i-1], x'[i], x[i+1], ..., x[n]) is outputted.

UpdateEpoch(par$_r$, ri[ep$_t$, i], rvi[ep$_t$], rvst[ep$_t$], rvst): The revocation parameters par$_r$=(par, Rpk), revocation information ri[ep$_t$, i]=(x[i], com, w, σ$_i$) (i∈[1, n]), revocation verification information rvi[ep$_t$]=com, revocation status information rvst[ep$_t$]=(r, x), provisional revocation status information rvst=x' are inputted and r'← $\mathcal{R}$ is picked. For all j such that x[j]≠x'[j], com'←ComUpd(par, com, j, x[j], r, x'[j], r') is run and for all i∈[1, n], if i≠j, w'$_i$←WitUpd(par, w, i, j, x[j], r, x'[j], r') is run. Revocation information ri[ep$_{t+1}$, i]=(x'[i], com', w'$_i$, σ$_i$) (i∈[1, n]), revocation verification information rvi[ep$_{t+1}$]=com', revocation status information rvst[ep$_{t+1}$]=(r', x') and provisional revocation status information rvst=x' is outputted.

CreatToken(Ipk, par$_r$, a$_{i,1}$, ..., a$_{i,n}$, i, s$_i$, ri[ep$_t$, i], $\mathcal{V}_j$): On input of the public key Ipk, the revocation parameters par$_r$, the attributes (a$_{i,1}$, ..., a$_{i,n}$), the revocation handle i, the credential s$_i$, the revocation information ri[ep$_t$,i]=(x[i], com, w$_i$, σ$_i$) (i∈[1, n]), and the identifier of verifying computer system $\mathcal{V}_j$, it computes a commitment (com, open)←Com (par$_c$, x[i]), a witness wit←Prove(par$_c$, com, x[i], open) and the following zero-knowledge proof of knowledge:

$$K_{x[i],x[i,1\ldots j-1],x[i,j+1\ldots m],s_i,a_1,\ldots,a_j,i,w_i}:$$

$$\textit{VfSig}(pk,s_i,\langle a_i,\ldots,a_j,i\rangle)=1 \wedge$$

Verify(par,com,x[i],i,w)=1

$$x[i]=x[i,j+1\ldots m]\|1\|x[i,1\ldots j-1] \wedge$$

$$x[i,j+1\ldots m]\in[0,2^{m-j+1}] \wedge x[i,1\ldots j-1]\in[0,2^{j-1}]$$

Instantiated with the above identified building-blocks, the proof may be as follows:

$$K_{x[i],x[i,1\ldots j-1],x[i,j+1\ldots m],s_i,a_1,\ldots,a_j,i,\tilde{g}_i,w_i,R,S,T,\text{wit}}:$$

$$\textit{VfSig}(pk,s_i,\langle a_i,\ldots,a_j,i\rangle)=1 \wedge$$

$$e(R,V)e(S,\tilde{g})g(g,W_1)^{id}e(g,W_2)^i e(g,Z)^{-1}=1 \wedge$$

$$e(R,T)e(U_1,\tilde{g}_i)e(g,\tilde{g})^{-1}=1 \wedge$$

$$e(\text{com},\tilde{g}_i)^{-1}e(w_i,\tilde{g})e(g_1,\tilde{g}_i)^{x[i]}=1 \wedge$$

$$1=\textit{VfCom}(par_c,\text{com},x[i],i,\text{wit}) \wedge$$

$$\text{com}=(g^{2^{j+1}})^{x[i,j+1\ldots m]}g^{2^j}g^{x[i,1\ldots j-1]}h^{wit} \wedge$$

$$x[i,j+1\ldots m]\in[0,2^{m-j+1}] \wedge x[i,1\ldots j-1]\in[0,2^{j-1}]$$

A presentation token tk is outputted, which consists of the proof and the revocation information x[i].

VfToken (Ipk, par$_r$, tk, rvi[ep$_t$], $\mathcal{V}_j$): On input of the public key Ipk, the revocation parameters par$_r$, the presentation token tk, and the revocation verification information rvi[ep$_t$], and the identifier of verifying computer system $\mathcal{V}_j$, verify the proof in the presentation token tk and output 1 if is valid and 0 otherwise.

The interaction between issuing computer system, user computer device, verifying computer system and revocation computer system is the same as described before for the other preferred embodiment, except for the computation of the presentation token tk.

To compute a presentation token, the user computer device computes a zero-knowledge proof of knowledge of a credential cr assigned to the user computer device and of the signature s$_i$, and proves that the revocation handle i in the credential cr equals the one in signature s$_i$. The user computer device also proves possession of a witness value w$_i$ such that the verification equation e(com, $\tilde{g}_i$)$^{-1}$ e(w$_i$, $\tilde{g}$)e(g$_1$, $\tilde{g}_i$)$^{x[i]}$=1 holds. Finally, the user computer device proves that x[i,j]=1.

For a revocation handle i assigned to the user computer device $\mathcal{U}_i$ having a credential cr on attributes a$_1$, ..., a$_l$ and revocation handle i. The proof works as follows:

In this case, to prove that x[i,j]=1, the user computer device computes a commitment value com to x[i] with opening open, proves that x[i]=x[i, j+1 ... m]||1||x[i, 1 ... j−1], where || denotes concatenation and proves that x[i, j+1 ... m] and x[i, 1 ... j−1] lie in the correct intervals.

The invention claimed is:

1. A computer-implemented method for flexible revocation of credentials, the method comprising:
   issuing and storing a plurality of credentials by a credential issuing computer system, each credential being provided to a user computer device, the user computer device being configured for requesting one or more hardware and/or software functions offered and provided by one or more credential verifying computer systems;
   initializing and storing by a revocation computer system a revocation status vector comprising vector elements, wherein for a set of the vector elements:
      each vector element is assigned to a different one of the credentials,
      each vector element comprises a sequence of two or more bits, wherein each bit of the sequence of two or more bits is assigned to a different one of the functions,
      the bit value at a given bit position of the sequence of two or more bits is indicative of the credential assigned to the vector element comprising said sequence of two or more bits,
      a revocation status indicates whether said credential is valid or invalid for the function assigned to said bit position, and
      for each sequence of two or more bits the same bit positions are assigned to the same functions;
   transforming the revocation status vector by the revocation computer system into a commitment value and providing the commitment value to the one or more credential verifying computer systems;
   computing a witness value by the revocation system for each vector element of the set of vector elements;
   providing to the user computer device by the revocation computer system the vector element which is assigned to a credential of said user computer device and a respective witness value, the witness value proving that the vector element provided is identical to a vector element for which the witness value was computed;
   generating a presentation token by the user computer device for the credential of said user computer device, the presentation token comprising the vector element provided by the revocation computer system and a proof of possession of the respective credential assigned to said vector element and a proof of possession of the witness value computed for said vector element;

transmitting by the user computer device the presentation token and a request for one of the hardware and/or software functions to one of the one or more credential verifying computer systems;

receiving the presentation token and the request by said credential verifying computer system;

determining by the receiving credential verifying computer system whether the revocation status of the requested function of the credential for which the presentation token was generated is valid using the commitment value for verifying the proof of possession of the witness value comprised by the presentation token; and based on determining by the receiving credential verifying computer system that the revocation status of the requested function of the credential for which the presentation token was generated is valid, providing the requested function to the requesting user computer device.

2. The computer-implemented method of claim 1, further comprising revoking the credential by the revocation computer system in response to receiving a revocation request to revoke the credential for a function offered by the credential verifying computer system, the method of revocation comprising:

generating an updated vector element for the vector element of the revocation status vector assigned to the credential to be revoked by altering the revocation status associated with the credential to be revoked;

providing said updated vector element to the user computer device to which the updated vector element is assigned via the credential to be revoked;

updating the commitment value with said updated vector element and providing said updated commitment value to the one or more credential verifying computer systems and to the user computer device to which the updated vector element is assigned via the credential to be revoked;

updating with said updated vector element each witness value which computation included the vector element for which the updated vector element is generated; and providing each updated witness value to the user computer device to which the updated witness value is assigned via the vector element for which the updated witness value is computed.

3. The computer-implemented method of claim 2, wherein altering the revocation status of the credential comprises altering the bit sequence of the vector element assigned to said credential to be revoked, and wherein the bit value at the bit position assigned to said function to be revoked is a value indicating validity or a value indicating invalidity.

4. The computer-implemented method of claim 2, the revocation request being a request of a set of revocation requests, the method of revocation comprising:

collecting the received revocation requests until a collection criterion is fulfilled; and based on fulfilling the collection criteria, updating the vector elements of the revocation vector, the commitment value, and the witness values according to the collected revocation requests.

5. The computer-implemented method of claim 4, further comprising:

initializing by the revocation computer system a provisional revocation status vector identical to the initialized revocation status vector;

collecting the received revocation requests comprising altering the revocation statuses identified by the provisional revocation status vector according to the received revocation requests; and updating the vector elements of the revocation vector, wherein the commitment value and the witness values performed with the vector elements of the provisional vector elements differ from the corresponding vector elements of the revocation vector.

6. The computer-implemented method of claim 1, the generation of the presentation token further comprising:

computing an additional commitment to the vector element comprised of the presentation token and an additional witness proving that the additional commitment is a commitment to said vector element, the presentation token comprising a proof of possession of the additional witness proving that the provided vector element is identical to the vector element assigned to the credential for which the presentation token was generated and proving that the bit value at the bit position of the sequence of bits of said vector element assigned to the requested function identifies a revocation status indicating that said credential is valid for the function assigned to said bit position.

7. The computer-implemented method of claim 1, the credential provided to the user computer device being an attribute-based credential comprising attributes incorporated into the credentials by the issuing computer system, the attributes being assigned to the user of the user computer device to which the credential is provided, the presentation token generated by the user computer device further revealing at least one of the attributes of the credential, the generation of the presentation token determining which one of the attributes is revealed in the generated presentation token.

8. A computer program product for flexible revocation of credentials, the computer program product comprising:

one or more computer-readable non-transitory storage media and program instructions stored on the one or more computer-readable storage media, the program instructions comprising:

program instructions to issue and store a plurality of credentials by a credential issuing computer system, each credential being provided to a user computer device, the user computer device being configured for requesting one or more hardware and/or software functions offered and provided by one or more credential verifying computer systems;

program instructions to initialize and store by a revocation computer system a revocation status vector comprising vector elements, wherein for a set of the vector elements:

each vector element is assigned to a different one of the credentials, each vector element comprises a sequence of two or more bits, wherein each bit of the sequence of two or more bits is assigned to a different one of the functions, the bit value at a given bit position of the sequence of two or more bits is indicative of the credential assigned to the vector element comprising said sequence of two or more bits, a revocation status indicates whether said credential is valid or invalid for the function assigned to said bit position, and for each sequence of two or more bits the same bit positions are assigned to the same functions;

program instructions to transform the revocation status vector by the revocation computer system into a commitment value and providing the commitment value to the one or more credential verifying computer systems;

program instructions to compute a witness value by the revocation system for each vector element of the set of vector elements;

program instructions to provide to the user computer device by the revocation computer system the vector element which is assigned to a credential of said user computer device and a respective witness value, the witness value proving that the vector element provided is identical to a vector element for which the witness value was computed;

program instructions to generate a presentation token by the user computer device for the credential of said user computer device, the presentation token comprising the vector element provided by the revocation computer system and a proof of possession of the respective credential assigned to said vector element and a proof of possession of the witness value computed for said vector element;

program instructions to transmit by the user computer device the presentation token and a request for one of the hardware and/or software functions to one of the one or more credential verifying computer systems;

program instructions to receive the presentation token and the request by said credential verifying computer system;

program instructions to determine by the receiving credential verifying computer system whether the revocation status of requested function of the credential for which the presentation token was generated is valid using the commitment value for verifying the proof of possession of the witness value comprised by the presentation token; and based on determining by the receiving credential verifying computer system that the revocation status of the requested function of the credential for which the presentation token was generated is valid, program instructions to provide the requested function to the requesting user computer device.

9. The computer program product of claim 8, further comprising program instructions to revoke the credential by the revocation computer system in response to receiving a revocation request to revoke the credential for a function offered by the credential verifying computer system, the program instructions to revoke further comprising:

program instructions to generate an updated vector element for the vector element of the revocation status vector assigned to the credential to be revoked by altering the revocation status associated with the credential to be revoked;

program instructions to provide said updated vector element to the user computer device to which the updated vector element is assigned via the credential to be revoked;

program instructions to update the commitment value with said updated vector element and providing said updated commitment value to the one or more credential verifying computer systems and to the user computer device to which the updated vector element is assigned via the credential to be revoked;

program instructions to update with said updated vector element each witness value which computation included the vector element for which the updated vector element is generated; and program instructions to provide each updated witness value to the user computer device to which the updated witness value is assigned via the vector element for which the updated witness value is computed.

10. The computer program product of claim 9, wherein altering the revocation status of the credential comprises altering the bit sequence of the vector element assigned to said credential to be revoked, and wherein the bit value at the bit position assigned to said function to be revoked is a value indicating validity or a value indicating invalidity.

11. The computer program product of claim 9, wherein the revocation request being a request of a set of revocation requests, the program instructions to revoke further comprising:

program instructions to collect the received revocation requests until a collection criterion is fulfilled; and based on fulfilling the collection criteria, program instructions to update the vector elements of the revocation vector, the commitment value, and the witness values according to the collected revocation requests.

12. The computer program product of claim 11, further comprising:

program instructions to initialize by the revocation computer system a provisional revocation status vector identical to the initialized revocation status vector;

program instructions to collect the received revocation requests comprising altering the revocation statuses identified by the provisional revocation status vector according to the received revocation requests; and program instructions to update the vector elements of the revocation vector, wherein the commitment value and the witness values performed with the vector elements of the provisional vector elements differ from the corresponding vector elements of the revocation vector.

13. The computer program product of claim 8, the generation of the presentation token further comprising:

program instructions to compute an additional commitment to the vector element comprised of the presentation token and an additional witness proving that the additional commitment is a commitment to said vector element, the presentation token comprising a proof of possession of the additional witness proving that the provided vector element is identical to the vector element assigned to the credential for which the presentation token was generated and proving that the bit value at the bit position of the sequence of bits of said vector element assigned to the requested function identifies a revocation status indicating that said credential is valid for the function assigned to said bit position.

14. The computer program product of claim 8, the credential provided to the user computer device being an attribute-based credential comprising attributes incorporated into the credentials by the issuing computer system, the attributes being assigned to the user of the user computer device to which the credential is provided, the presentation token generated by the user computer device further revealing at least one of the attributes of the credential, the generation of the presentation token determining which one of the attributes is revealed in the generated presentation token.

15. A computer system for flexible revocation of credentials, the computer system comprising:
one or more computer processors, one or more computer-readable storage media, and program instructions stored on one or more of the computer-readable storage media for execution by at least one of the one or more processors, the program instructions comprising:
one or more computer-readable storage media and program instructions stored on the one or more computer-readable storage media, the program instructions comprising:
program instructions to issue and store a plurality of credentials by a credential issuing computer system, each credential being provided to a user computer device, the user computer device being configured for requesting one or more hardware and/or software functions offered and provided by one or more credential verifying computer systems;
program instructions to initialize and store by a revocation computer system a revocation status vector comprising vector elements, wherein for a set of the vector elements:
each vector element is assigned to a different one of the credentials,
each vector element comprises a sequence of two or more bits, wherein each bit of the sequence of two or more bits is assigned to a different one of the functions,
the bit value at a given bit position of the sequence of two or more bits is indicative of the credential assigned to the vector element comprising said sequence of two or more bits,
a revocation status indicates whether said credential is valid or invalid for the function assigned to said bit position, and
for each sequence of two or more bits the same bit positions are assigned to the same functions;
program instructions to transform the revocation status vector by the revocation computer system into a commitment value and providing the commitment value to the one or more credential verifying computer systems;
program instructions to compute a witness value by the revocation system for each vector element of the set of vector elements;
program instructions to provide to the user computer device by the revocation computer system the vector element which is assigned to a credential of said user computer device and a respective witness value, the witness value proving that the vector element provided is identical to a vector element for which the witness value was computed;
program instructions to generate a presentation token by the user computer device for the credential of said user device, the presentation token comprising the vector element provided by the revocation computer system and a proof of possession of the respective credential assigned to said vector element and a proof of possession of the witness value computed for said vector element;
program instructions to transmit by the user computer device the presentation token and a request for one of the hardware and/or software functions to one of the one or more credential verifying computer systems;
program instructions to receive the presentation token and the request by said credential verifying computer system;
program instructions to determine by the receiving credential verifying computer system whether the revocation status of requested function of the credential for which the presentation token was generated is valid using the commitment value for verifying the proof of possession of the witness value comprised by the presentation token; and
based on determining by the receiving credential verifying computer system that the revocation status of the requested function of the credential for which the presentation token was generated is valid, program instructions to provide the requested function to the requesting user computer device.

16. The computer system of claim 15, further comprising program instructions to revoke the credential by the revocation computer system in response to receiving a revocation request to revoke the credential for a function offered by the credential verifying computer system, the program instructions to revoke further comprising:
program instructions to generate an updated vector element for the vector element of the revocation status vector assigned to the credential to be revoked by altering the revocation status associated with the credential to be revoked;
program instructions to provide said updated vector element to the user computer device to which the updated vector element is assigned via the credential to be revoked;
program instructions to update the commitment value with said updated vector element and providing said updated commitment value to the one or more credential verifying computer systems and to the user computer device to which the updated vector element is assigned via the credential to be revoked;
program instructions to update with said updated vector element each witness value which computation included the vector element for which the updated vector element is generated; and
program instructions to provide each updated witness value to the user computer device to which the updated witness value is assigned via the vector element for which the updated witness value is computed.

17. The computer system of claim 16, wherein altering the revocation status of the credential comprises altering the bit sequence of the vector element assigned to said credential to be revoked, and wherein the bit value at the bit position assigned to said function to be revoked is a value indicating validity or a value indicating invalidity.

18. The computer system of claim 16, wherein the revocation request being a request of a set of revocation requests, the program instructions to revoke further comprising:
program instructions to collect the received revocation requests until a collection criterion is fulfilled; and
based on fulfilling the collection criteria, program instructions to update the vector elements of the revocation vector, the commitment value, and the witness values according to the collected revocation requests.

19. The computer system of claim 18, further comprising:
program instructions to initialize by the revocation computer system a provisional revocation status vector identical to the initialized revocation status vector;
program instructions to collect the received revocation requests comprising altering the revocation statuses identified by the provisional revocation status vector according to the received revocation requests; and
program instructions to update the vector elements of the revocation vector, wherein the commitment value and the witness values performed with the vector elements of the provisional vector elements differ from the corresponding vector elements of the revocation vector.

20. The computer system of claim 15, the generation of the presentation token further comprising:

program instructions to compute an additional commitment to the vector element comprised of the presentation token and an additional witness proving that the additional commitment is a commitment to said vector element, the presentation token comprising a proof of possession of the additional witness proving that the provided vector element is identical to the vector element assigned to the credential for which the presentation token was generated and proving that the bit value at the bit position of the sequence of bits of said vector element assigned to the requested function identifies a revocation status indicating that said credential is valid for the function assigned to said bit position.

21. The computer system of claim 15, the credential provided to the user computer device being an attribute-based credential comprising attributes incorporated into the credentials by the issuing computer system, the attributes being assigned to the user of the user computer device to which the credential is provided, the presentation token generated by the user computer device further revealing at least one of the attributes of the credential, the generation of the presentation token determining which one of the attributes is revealed in the generated presentation token.

* * * * *